United States Patent
Shibutani et al.

(10) Patent No.: US 7,482,089 B2
(45) Date of Patent: Jan. 27, 2009

(54) FUEL CELL

(75) Inventors: Tomohide Shibutani, Sayama (JP);
Osamu Kakutani, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 10/544,978

(22) PCT Filed: Mar. 2, 2004

(86) PCT No.: PCT/JP2004/002562

§ 371 (c)(1),
(2), (4) Date: Aug. 9, 2005

(87) PCT Pub. No.: WO2004/082048

PCT Pub. Date: Sep. 23, 2004

(65) Prior Publication Data

US 2006/0141337 A1     Jun. 29, 2006

(30) Foreign Application Priority Data

Mar. 10, 2003   (JP) .............................. 2003-063173

(51) Int. Cl.
*H01M 4/86* (2006.01)
*H01M 8/10* (2006.01)
(52) U.S. Cl. .............................. 429/42; 429/40; 429/30
(58) Field of Classification Search .................. 429/12, 429/30, 38–42, 22, 25
See application file for complete search history.

(56) References Cited

U.S. PATENT DOCUMENTS

| | | | | |
|---|---|---|---|---|
| 5,702,839 A | * | 12/1997 | Frost et al. .................... | 429/42 |
| 6,503,655 B1 | * | 1/2003 | Petricevic et al. ............. | 429/42 |
| 6,756,150 B2 | * | 6/2004 | Karuppaiah et al. ........... | 429/44 |

FOREIGN PATENT DOCUMENTS

| | | |
|---|---|---|
| JP | 5-315000 | 11/1993 |
| JP | 8-88008 | 4/1996 |
| JP | 9-283153 | 10/1997 |
| JP | 2002-042823 | 2/2002 |
| JP | 2002-117862 | 4/2002 |
| JP | 2002-298859 | 10/2002 |
| JP | 2002-319411 | 10/2002 |

OTHER PUBLICATIONS

IPDL machine translation of JP 2002-319411.*

* cited by examiner

*Primary Examiner*—Susy N Tsang-Foster
*Assistant Examiner*—Maria J Laios
(74) *Attorney, Agent, or Firm*—Hamre, Schumann, Mueller & Larson, P.C.

(57) ABSTRACT

A fuel cell is provided having a positive electrode layer (13) and a negative electrode layer (14) disposed on the front and rear sides of an electrolyte membrane (12), for generating electricity by bringing hydrogen into contact with a catalyst in the negative electrode layer and bringing oxygen into contact with a catalyst in the positive electrode layer. The positive electrode layer includes the components electrolyte, carbon (36, 37), a catalyst (38) carried on the carbon, a pore-forming material and a water-repellent resin. In the electrolyte membrane vicinity (34) of the positive electrode layer, which is a part where the reaction between the oxygen and the hydrogen ions proceeds readily, the electrolyte/carbon weight ratio and the carried catalyst amount are made large. In parts where product water tends to stagnate, the amounts of the pore-forming material and the water-repellent resin are increased.

2 Claims, 20 Drawing Sheets

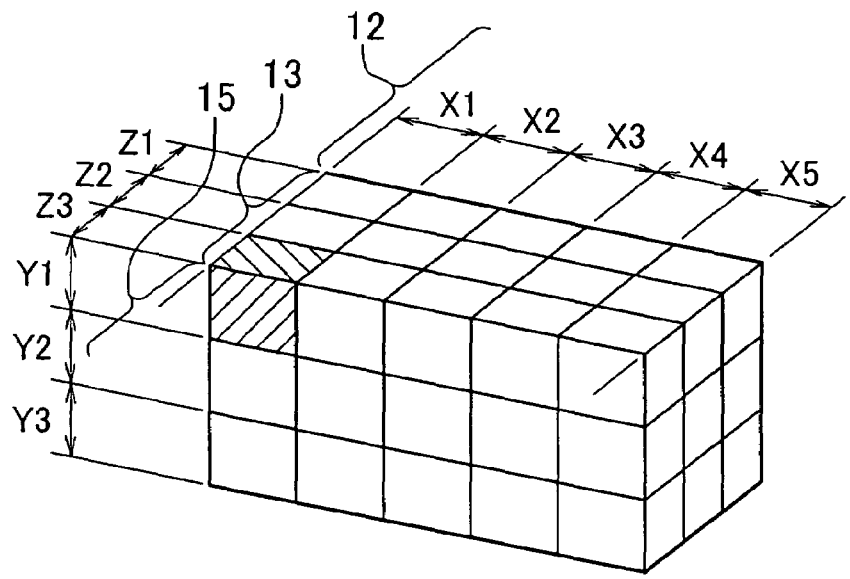

Z3 REGION

Y1 REGION

Y2 REGION

Y3 REGION

FUEL CELL

TECHNICAL FIELD

This invention relates to a fuel cell having a positive electrode layer and a negative electrode layer disposed on the front and rear sides of an electrolyte membrane, for generating electricity by bringing hydrogen into contact with a catalyst in the negative electrode layer and bringing oxygen into contact with a catalyst in the positive electrode layer.

BACKGROUND ART

A fuel cell of this kind is shown in FIG. 15, FIG. 16 and FIG. 17 hereof.

Referring to FIG. 15, a fuel cell 100 of related art is made up of an electrolyte membrane 101, positive and negative electrode layers 102, 103 disposed on the front and rear sides of the electrolyte membrane 101, a positive electrode diffusion layer 104 disposed on the positive electrode layer 102, a negative electrode diffusion layer 105 disposed on the negative electrode layer 103, an oxygen gas passage 106 provided on the outer face of the positive electrode diffusion layer 104, and a hydrogen gas passage (not shown) provided on the outer face of the negative electrode diffusion layer 105.

Oxygen gas flows from a supply side 106a of the oxygen gas passage 106 to a discharge side 106b.

As a result of oxygen gas flowing into the oxygen gas passage 106 and hydrogen gas flowing into the hydrogen gas passage, hydrogen ($H_2$) is brought into contact with a catalyst in the negative electrode layer 103 and oxygen ($O_2$) is brought into contact with a catalyst in the positive electrode layer 102, and a current is produced.

As shown in FIG. 16, hydrogen ions ($H^+$) produced in a reaction in the negative electrode layer 103 (see FIG. 15) flow through the electrolyte membrane 101 to the positive electrode layer 102 as shown with an arrow.

And as a result of oxygen gas being supplied to the positive electrode layer 102 from the oxygen gas passage 106 (see FIG. 15), oxygen gas flows toward the electrolyte membrane 101 through the positive electrode layer 102.

Consequently, hydrogen ions ($H^+$) and oxygen ($O_2$) react and product water ($H_2O$) is produced. The reaction between hydrogen ions ($H^+$) and oxygen ($O_2$) proceeds particularly in the area of the positive electrode layer 102 near its interface 108 with the electrolyte membrane 101, that is, in a 'full catalytic reaction area' 102a shown with dashed-line hatching.

Of the product water ($H_2O$) produced, some product water returns to the electrolyte membrane 101 and keeps the electrolyte membrane 101 wet and thereby improves generation efficiency.

Of the remainder of the product water ($H_2O$), some drains from inside the positive electrode layer 102 to the positive electrode diffusion layer 104 as shown by the arrow a, and the remainder of the product water ($H_2O$) descends under its own weight through the inside of the positive electrode layer 102 as shown by the arrow b. Because of this, there is a tendency for product water ($H_2O$) to collect at the bottom side 102b of the positive electrode layer 102, and this has been a hindrance to raising the generation efficiency of the fuel cell.

As shown in FIG. 17, oxygen gas is passed from the supply side 106a of the oxygen gas passage 106 to the discharge side 106b as shown with an arrow.

Of the product water ($H_2O$) flowing out from the positive electrode layer 102 to the positive electrode diffusion layer 104, some product water evaporates and transpires into the oxygen gas passage and is carried by the oxygen gas in the oxygen gas passage 106.

Oxygen gas readily stagnates in the bends 106c, 106c of the oxygen gas passage 106, and the flow of oxygen gas in the discharge side 106b of the oxygen gas passage 106, that is, in the bottom side 102b of the positive electrode layer 102, tends to decrease.

Because of this, in the discharge side 106b of the oxygen gas passage 16, product water having transpired into the oxygen gas passage is not drained efficiently, product water tends to collect in the discharge side 106b, and this constitutes a hindrance to raising the generation efficiency of the fuel cell.

For example in JP-A-8-088008, a fuel cell is proposed wherein, to take account of the fact that the reaction between hydrogen ions ($H^+$) and oxygen ($O_2$) proceeds particularly in the 'full catalytic reaction area' 102a as shown in FIG. 16, the amount of electrolyte in the positive electrode layer is made greater on the electrolyte membrane side.

In this fuel cell, a large amount of electrolyte is included in the positive electrode layer 102 in the vicinity of its interface 108 with the electrolyte membrane 101, whereby it is possible to raise the conductivity of hydrogen ions ($H^+$) at the interface 108 between the positive electrode layer 102 and the electrolyte membrane 101.

And for example in JP-A-2002-298859, a fuel cell is disclosed wherein, in view of the fact that stagnation of product water is a hindrance to raising generation efficiency, product water ($H_2O$) is drained from inside the positive electrode layer 102 efficiently.

In this fuel cell, a water-repellent resin is included in the surface of the positive electrode layer 102 except in the bottom part 102b, so that product water flows out easily from the bottom part 102b and product water can be prevented from collecting in this bottom part 102b.

Also, for example in JP-A-2002-042823, a fuel cell is disclosed wherein, to raise generation efficiency by keeping the electrolyte membrane 101 wet, the water content of the electrolyte membrane 101 is kept good.

In this fuel cell, drainage of product water is suppressed in the supply side 106a of the oxygen gas passage 106, and drainage of product water is promoted in the discharge side 106b of the oxygen gas passage 106, whereby it becomes possible to keep the water content of the electrolyte membrane good.

Here, to further widen the usability of the fuel cell in the industrial field, as well as raising the performance of the fuel cell it is important to keep down the cost of the fuel cell.

However, with only the measure of including a large amount of electrolyte in the vicinity of the interface with the electrolyte membrane, as in the fuel cell of JP-A-8-088008, it is difficult to further raise the performance of the fuel cell and lower the cost of the fuel cell.

And with only the measure of including a water-repellent resin in the surface of the positive electrode layer except in its bottom part, as in the fuel cell of JP-A-2002-298859, it is difficult to further raise the performance of the fuel cell and lower the cost of the fuel cell.

And with only the measure of suppressing the drainage of product water in the supply side of the oxygen gas passage and promoting the drainage of product water in the discharge side of the oxygen gas passage, as in JP-A-2002-042823, it is difficult to further raise the performance of the fuel cell and lower the cost of the fuel cell.

So, a fuel cell has been awaited which has excellent generation efficiency and with which it is possible to suppress cost.

DISCLOSURE OF THE INVENTION

In carrying out experiments for raising the generation efficiency of fuel cells, the present inventors discovered that in a positive electrode layer there are places where oxygen gas can be introduced easily and places where it cannot be introduced easily. The inventors also discovered that there are parts where the reaction between hydrogen ions ($H^+$) and oxygen ($O_2$) proceeds easily and parts where it proceeds slowly. Also, they discovered that there are parts where product water tends to reside.

When this was studied in more detail, it was found that the generation reaction and the stagnation of product water change gradually from the electrolyte membrane side of the positive electrode layer toward the positive electrode diffusion layer, and also change gradually from the supply side of the oxygen gas passage toward the discharge side. It was also found that, when the positive electrode layer is used in a vertical position, the generation reaction and the stagnation of product water change gradually from the upper side of the positive electrode layer toward the lower side.

From these points of view, the prospect was obtained that the problem can be solved by gradually changing the composition of the positive electrode layer, i.e. electrolyte, catalyst and pore-forming material and so on, from the electrolyte membrane side toward the positive electrode diffusion layer; gradually changing it from the vertical-direction top part toward the bottom part; and gradually changing it from the supply side of the oxygen gas passage toward the discharge side.

Accordingly, the present invention provides a fuel cell characterized in that it has: an electrolyte membrane; positive and negative electrode layers disposed on the front and rear sides of the electrolyte membrane and oriented vertically; a positive electrode diffusion layer disposed on the positive electrode layer; a negative electrode diffusion layer disposed on the negative electrode layer; an oxygen gas passage provided on the outer face of the positive electrode layer; and a hydrogen gas passage provided on the outer face of the negative electrode layer, and the positive electrode layer includes an electrolyte, carbon, a catalyst carried on the carbon, a pore-forming material and a water-repellent resin, and the electrolyte/carbon weight ratio, the carried amount of catalyst, the amount of pore-forming material and the amount of water-repellent resin change gradually from the electrolyte membrane side toward the positive electrode diffusion layer, change gradually from the vertical-direction top part toward the bottom part, and change gradually from the supply side of the oxygen gas passage toward the discharge side.

Thus, in this invention, the electrolyte/carbon weight ratio, the carried catalyst amount (meaning the amount of catalyst carried on the carbon), the pore-forming material amount and the water-repellent resin amount are gradually changed from the electrolyte membrane side of the positive electrode layer toward the positive electrode diffusion layer. And the electrolyte/carbon weight ratio, the carried catalyst amount, the pore-forming material amount and the water-repellent resin amount are gradually changed from the vertical-direction top part of the positive electrode layer to the bottom part. And also the electrolyte/carbon weight ratio, the carried catalyst amount, the pore-forming material amount and the water-repellent resin amount are gradually changed from the supply side of the oxygen gas passage to the discharge side.

By this means, the components of the positive electrode layer can be gradually changed in correspondence with the state of introduction of oxygen gas, gradually changed in correspondence with the state of reaction between the hydrogen ions ($H^+$) and the oxygen ($O_2$), and gradually changed in correspondence with the state of drainage of product water. In this way, the components constituting the positive electrode layer can be included suitably in correspondence with the different parts of the positive electrode layer, the generation efficiency in the different parts can be raised, and the drainage of product water can be regulated well.

Also, by the components constituting the positive electrode layer being included suitably in correspondence with the different parts of the positive electrode layer, the components are prevented from being included in excess. By this means it is possible to keep the included amounts of the components constituting the positive electrode layer to the minimum necessary, and cost reductions can be achieved.

In the invention, preferably, the electrolyte/carbon weight ratio and the carried catalyst amount included in the positive electrode layer decrease from the electrolyte membrane side toward the positive electrode diffusion layer, decrease from the vertical-direction top part of the positive electrode layer to the bottom part, and decrease from the supply side of the oxygen gas passage toward the discharge side, and the pore-forming material amount and the water-repellent resin amount included in the positive electrode layer increase from the electrolyte membrane side toward the positive electrode diffusion layer, increase from the vertical-direction top part of the positive electrode layer to the bottom part, and increase from the supply side of the oxygen gas passage toward the discharge side.

Here, the generation reaction proceeds particularly at the boundary between the electrolyte membrane and the positive electrode layer, and by degrees becomes slower from the boundary toward the positive electrode diffusion layer. Also, the generation reaction proceeds particularly at the top part of the positive electrode layer, and by degrees becomes slower from the top part toward the bottom part. And also, the generation reaction proceeds particularly in the supply side of the oxygen gas passage and by degrees becomes slower from the supply side toward the discharge side. Accordingly, in parts where it is necessary to make the electrolyte/carbon weight ratio and the carried catalyst amount large, these components can be included in large amount, and the generation efficiency of the parts can thereby be raised. And in parts where only a little electrolyte/carbon weight ratio and carried catalyst amount are needed, these components can be made small and these components being included in excess can be prevented. By this means it is possible to keep the included amounts of the components constituting the positive electrode layer to the minimum necessary, and cost reductions can be achieved.

On the other hand, to secure water content of the electrolyte membrane, it is necessary for the drainage of product water to be suppressed in the vicinity of the electrolyte membrane. However, to drain product water from inside the positive electrode layer, on the positive electrode diffusion layer side it is necessary to raise the drainage. Because product water tends to stagnate at the bottom of the positive electrode layer, it is necessary to raise the drainability from the top part of the positive electrode layer toward the bottom part. And because product water tends to stagnate in the discharge side of the oxygen gas passage, it is necessary to raise the drainability from the supply side toward the discharge side.

Accordingly, the pore-forming material amount and the water-repellent resin amount are made to increase from the electrolyte membrane vicinity toward the positive electrode diffusion layer, made to increase from the vertical-direction top part toward the bottom part, and made to increase from the supply side of the oxygen gas passage toward the discharge side. By this means, it is possible to include a pore-forming material amount and a water-repellent resin amount suitably in each part of the positive electrode layer and thereby suitably regulate the drainage of product water in the different parts. Therefore, the pore-forming material and the water-repellent resin are made to be included in large amounts in parts where these components are needed in large amounts. Also, by making the pore-forming material amount and the water-repellent resin amount small in parts where they are only needed in small amounts, it is possible to prevent these components being included in excess.

Also, in this invention, preferably, at the face where the positive electrode layer contacts the electrolyte membrane, the electrolyte/carbon weight ratio, the carried catalyst amount, the pore-forming material amount and the water-repellent resin amount are made uniform.

In the vicinity of the electrolyte membrane full catalytic reaction is required. Additionally, it is necessary to secure water content of the electrolyte membrane side in order to make the catalytic reaction proceed fully. Therefore, in the electrolyte membrane vicinity, the components of the positive electrode layer are each included uniformly, so that full catalytic reaction is possible and so that water content of the electrolyte membrane is secured. By this means, the generation reaction is raised fully in the vicinity of the electrolyte membrane.

BRIEF DESCRIPTION OF THE DRAWINGS

FIG. 7A through FIG. 7G are schematic views showing the compositions of blocks obtained by dividing up the positive electrode layer of the first embodiment;

BEST MODE FOR CARRYING OUT THE INVENTION

A number of preferred embodiments of the invention will now be described in detail with reference to the drawings.

Figure 1:
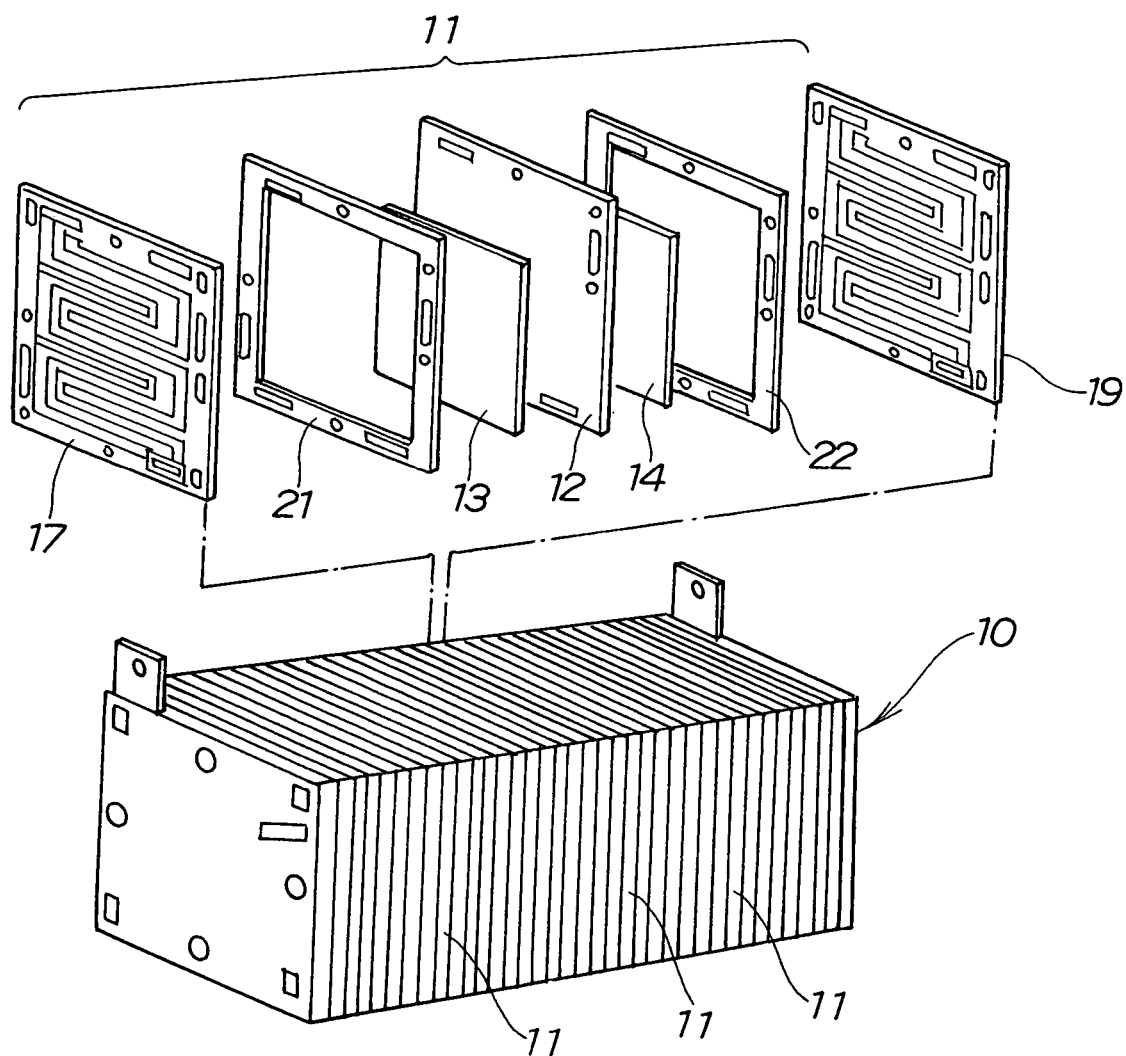
FIG. 1 is a perspective view of a fuel cell, with one cell shown in detail, according to a first embodiment of the invention.

FIG. 1 shows the whole of a fuel cell according to a first embodiment of the invention in perspective view and shows one cell of this fuel cell in exploded view. The fuel cell 10 shown in FIG. 1 is made by stacking together a number of cells 11.

Each cell 11 has a structure in which positive and negative electrode layers 13, 14 are disposed on the front and rear sides respectively of an electrolyte membrane 12; a positive electrode diffusion layer 15 (see FIG. 2) is disposed on the positive electrode layer 13; a negative electrode diffusion layer 16 (see FIG. 2) is disposed on the negative electrode layer 14; by a separator 17 being set on the outer face of the positive electrode diffusion layer 15 an oxygen gas passage 18 (see FIG. 2) is formed by the positive electrode diffusion layer 15 and the separator 17; and by a separator 19 being set on the outer face of the negative electrode diffusion layer 16a hydrogen gas passage 20 (see FIG. 2) is formed by the negative electrode diffusion layer 16and the separator 19. The positive and negative electrodes 13, 14, the positive and negative electrode diffusion layers 15, 16 and the separators 17, 19 are disposed so as to be oriented vertically.

The reference numbers 21 and 22 denote seals. By a seal 21 being interposed between the electrolyte membrane 12 and the separator 17, the gap between the electrolyte membrane 12 and the separator 17 is sealed. By a seal 22 being interposed between the electrolyte membrane 12 and the separator 19, the gap between the electrolyte membrane 12 and the separator 19 is sealed.

Figure 2:
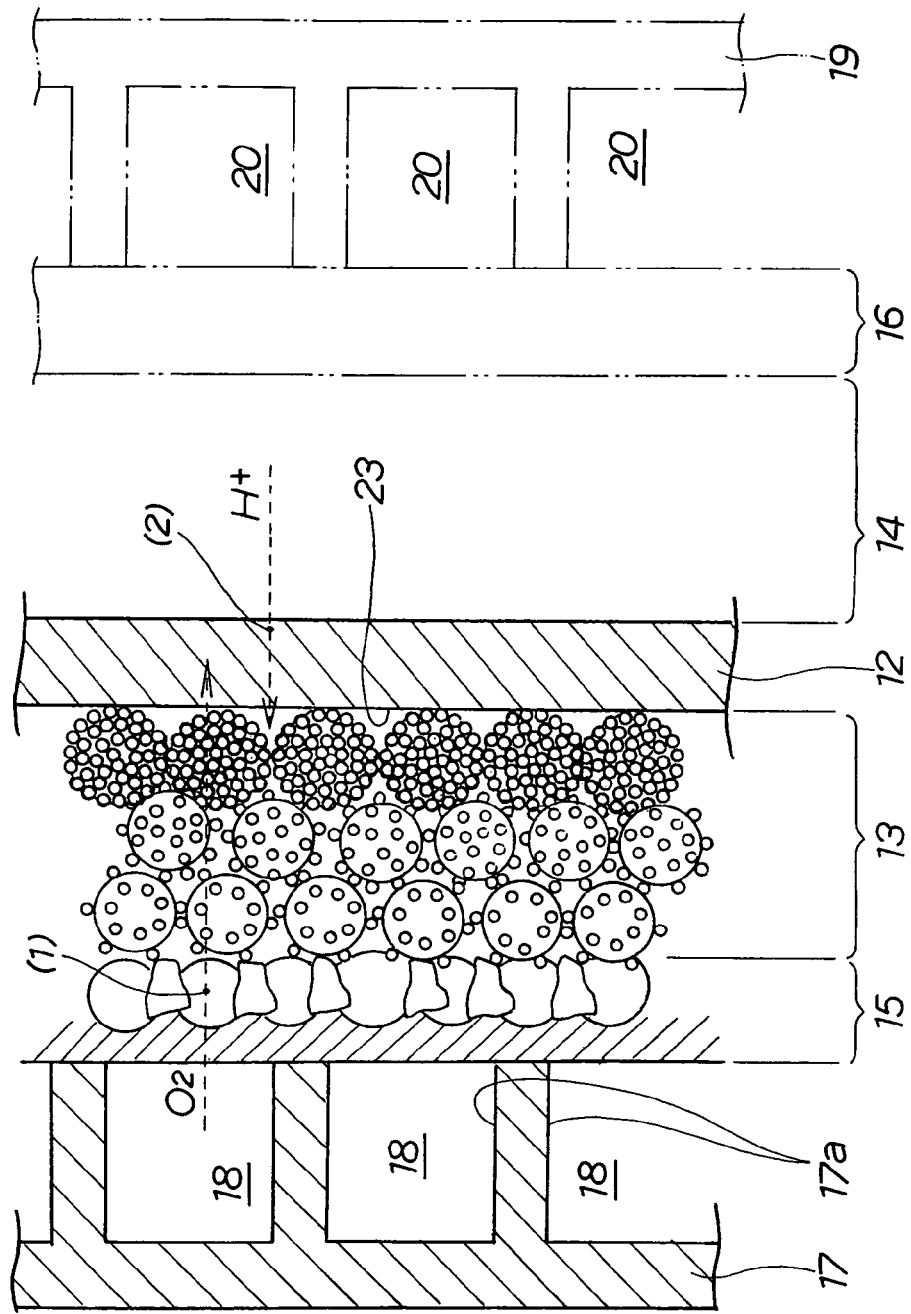
FIG. 2 is a partial sectional view of the cell shown in FIG. 1.

FIG. 2 shows a partial sectional view of the cell shown in FIG. 1.

The positive electrode layer 13 is disposed on one side of the electrolyte membrane 12, and the positive electrode diffusion layer 15 is further disposed on the positive electrode layer 13. The separator 17 is set on the outer face of the positive electrode diffusion layer 15.The oxygen gas passage 18 is formed by the positive electrode diffusion layer 15 and grooves 17a formed in the separator 17.

As a result of oxygen gas being supplied to the oxygen gas passage 18, oxygen ($O_2$) enters the positive electrode layer 13 through the positive electrode diffusion layer 15 as shown by the arrow (1) and enters the electrolyte membrane 12 from inside the positive electrode layer 13.

Hydrogen ions (H⁺) produced in a reaction in the negative electrode layer 14 enter the positive electrode layer 13 through the electrolyte membrane 12 as shown by the arrow (2).

The hydrogen ions (H⁺) and the oxygen (O₂) react, and product water is produced. The reaction between the hydrogen ions (H⁺) and the oxygen (O₂) proceeds particularly in the region of the positive electrode layer 13 near its interface 23 with the electrolyte membrane 12.

Of the produced product water, some product water is returned to the electrolyte membrane 12. This is to keep the electrolyte membrane 12 in a wet state.

Of the remaining product water, some flows out from inside the positive electrode layer 13 into the positive electrode diffusion layer 15, and the rest of the product water descends under its own weight through the inside of the positive electrode layer 13.

Figure 3:
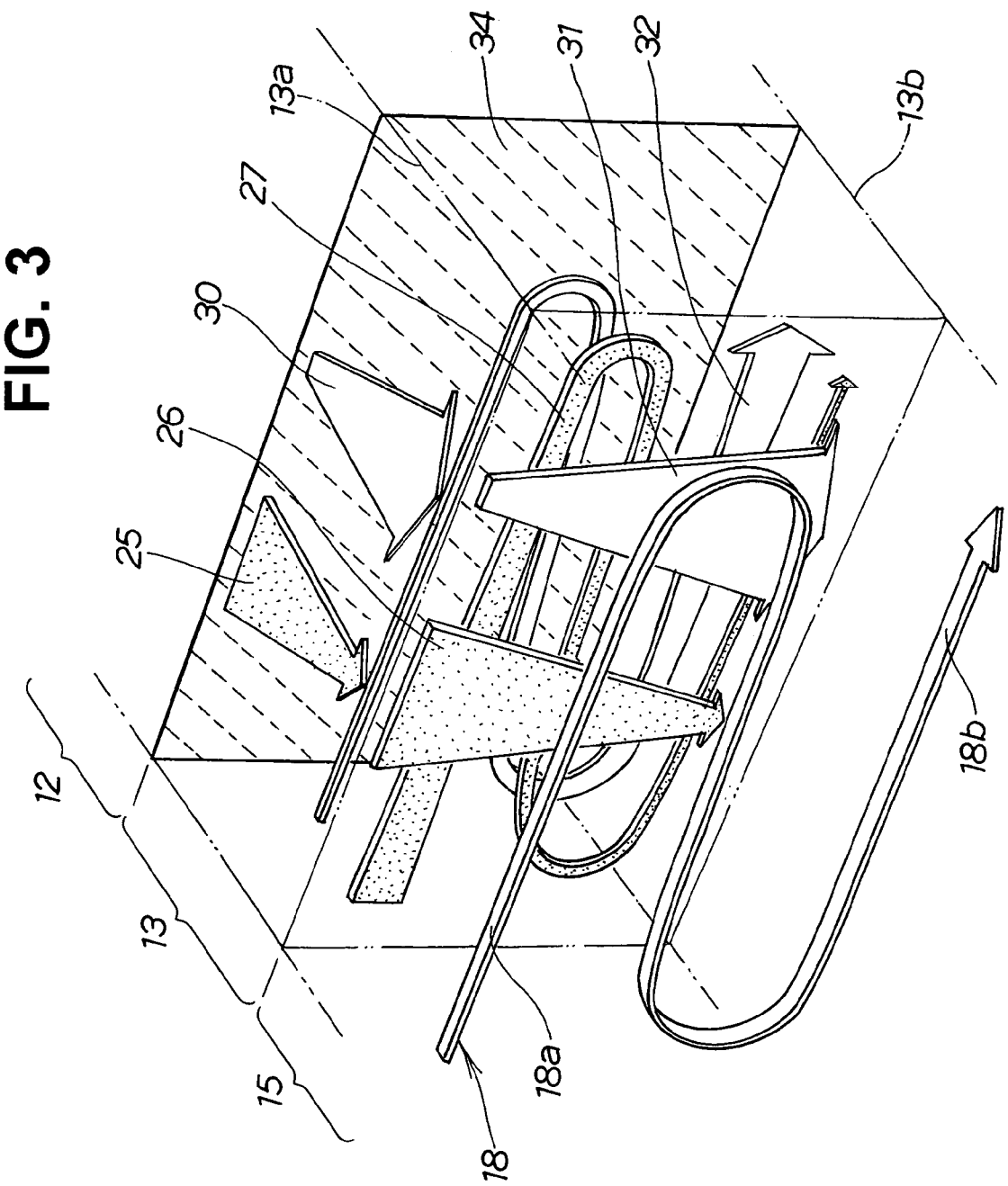
FIG. 3 is a view illustrating schematically the amounts of components included in a positive electrode layer shown in FIG. 2.

As shown in FIG. 3, the positive electrode layer 13 is disposed between the electrolyte membrane 12 and the positive electrode diffusion layer 15. The oxygen gas passage 18 (see also FIG. 2) is provided along the outer face of the positive electrode diffusion layer 15.

To facilitate understanding, the oxygen gas passage 18 will be described as a snaking passage.

In the oxygen gas passage 18, oxygen gas flows from a supply side 18a to a discharge side 18b.

The positive electrode layer 13 includes mainly electrolyte, carbon, a catalyst carried on the carbon, a pore-forming material, a pore-forming volatile solvent, and a water-repellent resin.

The electrolyte is for example a fluorine compound, and the catalyst is for example platinum.

The pore-forming material is for altering the porosity of the positive electrode layer 13, and by increasing the amount of pore-forming material it is possible to raise the porosity. By adjusting the porosity, it is possible to control the diffusion of oxygen gas and the drainage of product water. This pore-forming material is for example a conductive needle-like carbon fiber. The pore-forming volatile solvent is for example butanol (butyl alcohol).

The water-repellent resin is for example tetrafluoroethylene.

The electrolyte, the carbon and the catalyst carried on the carbon influence the generation reaction, and when these substances are present in greater quantities the generation reaction increases and when they are present in smaller quantities the generation reaction decreases.

The pore-forming volatile solvent forms pores by evaporating during drying, and fulfills the same role as the pore-forming material. The water-repellent resin raises the drainability of product water.

That is, the pore-forming material, the pore-forming volatile solvent and the water-repellent resin influence the drainability of the product water, and when these substances decrease the drainability falls and when they increase the drainability rises.

The electrolyte/carbon weight ratio and the amount of catalyst carried on the carbon (hereinafter, 'carried catalyst amount') are gradually decreased from the electrolyte membrane 12 side toward the positive electrode diffusion layer 15 side as shown by a first arrow 25.

The electrolyte/carbon weight ratio and the carried catalyst amount are gradually decreased from the vertical-direction top to the bottom as shown by a second arrow 26.

And the electrolyte/carbon weight ratio and the carried catalyst amount are gradually decreased from the supply side 18a of the oxygen gas passage 18 to the discharge side 18b as shown by a third arrow 27.

The pore-forming material amount, the pore-forming volatile solvent and the water-repellent resin amount are gradually increased from the electrolyte membrane 12 side toward the positive electrode diffusion layer 15 as shown by a fourth arrow 30.

Also, the pore-forming material, the pore-forming volatile solvent and the water-repellent resin amount are gradually increased from the vertical-direction top 13a of the positive electrode layer 13 toward the bottom 13b as shown with a fifth arrow 31.

And also, the pore-forming material, the pore-forming volatile solvent and the water-repellent resin amount are gradually increased from the supply side 18a of the oxygen gas passage 18 to the discharge side 18b as shown with a sixth arrow 32.

On the other hand, at the face 34 in contact with the electrolyte membrane 12 (the area shown with dashed-line hatching), the electrolyte/carbon weight ratio, the carried catalyst amount, the pore-forming material amount, the pore-forming volatile solvent and the water-repellent resin amount were made uniform.

Figure 4A:
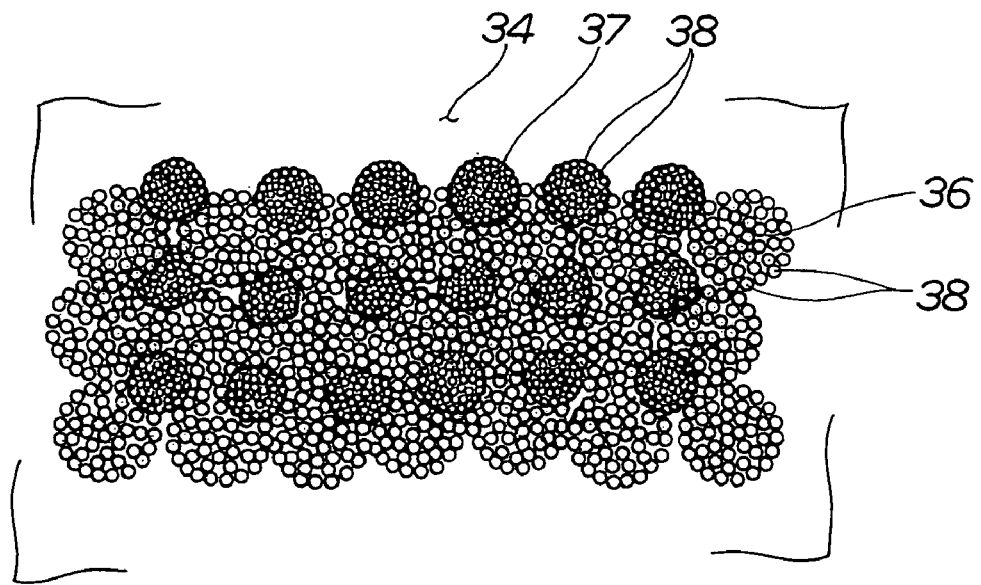
FIG. 4A shows carbon and carried catalyst amount in the electrolyte membrane vicinity of a positive electrode layer.
Figure 4B:
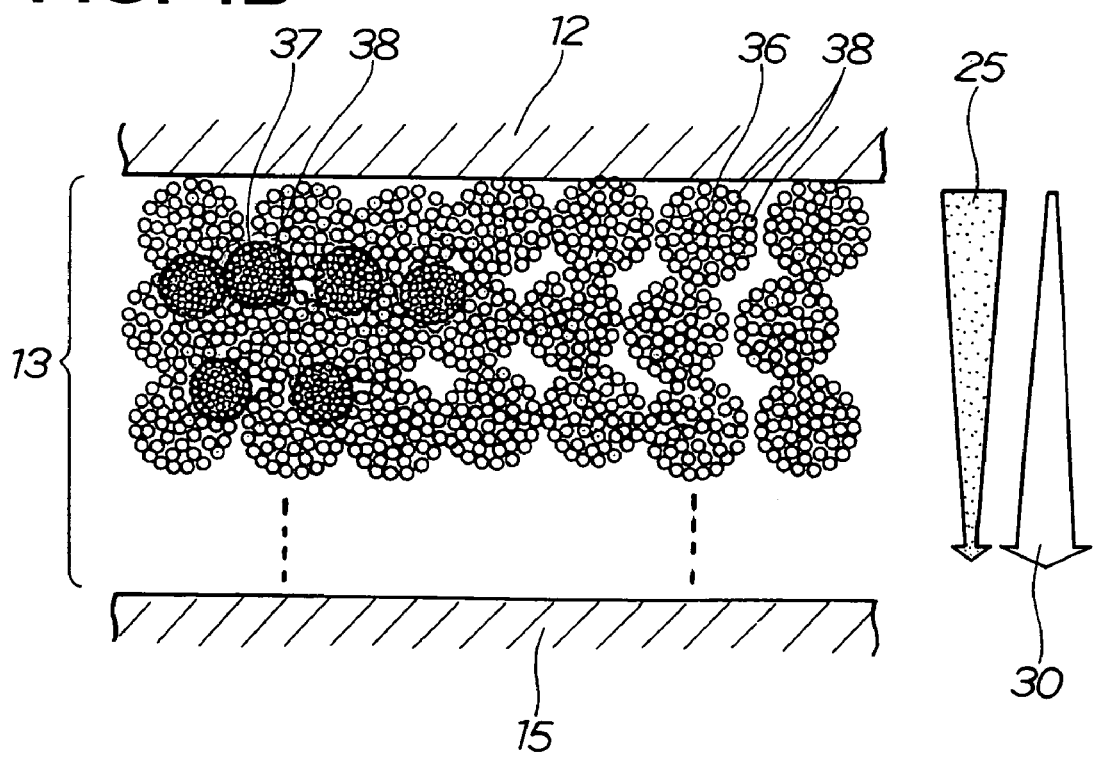
FIG. 4B shows carbon and carried catalyst amount from the electrolyte membrane vicinity toward a positive electrode diffusion layer.

FIG. 4A shows the state of the carbon and the catalyst carried on the carbon at the face 34 (see also FIG. 3), which contacts the electrolyte membrane, of the positive electrode layer 13, and FIG. 4B shows the electrolyte/carbon weight ratio and the carried amount of the catalyst 38 having been gradually decreased in the positive electrode layer 13 from the electrolyte membrane 12 side toward the positive electrode diffusion layer 15.

In FIG. 4A, at the face 34 in contact with the electrolyte membrane, i.e. in the vicinity of the electrolyte membrane 12, a full catalytic reaction is required.

Therefore, to make a full catalytic reaction possible in the positive electrode layer 13 in the vicinity of the electrolyte membrane 12, a large-diameter carbon 36, a small-diameter carbon 37, and a catalyst 38 carried on these carbons 36, 37 are included in the positive electrode layer 13 in large amounts and uniformly.

Specifically, the catalyst 38 is carried in a dense state on the surface of a large-diameter carbon 36, and the catalyst 38 is carried in a dense state on the surface of the small-diameter carbon 37. And these carbons 36, 37 are included densely in the face 34 in contact with the electrolyte membrane.

At the face 34 in contact with the electrolyte membrane, that is, in the vicinity of the electrolyte membrane 12 (see FIG. 2, FIG. 3), in order to make the catalytic reaction proceed fully, it is necessary to secure water content of the electrolyte membrane 12. Therefore, at the face 34 in contact with the electrolyte membrane, the pore-forming material amount, the pore-forming volatile solvent and the water-repellent resin amount are included as small amounts and uniformly. By this means it is possible to raise the generation reaction fully in the vicinity of the electrolyte membrane 12.

In FIG. 4B, the catalyst 38 is carried in a dense state on the surface of the large-diameter carbon 36, and the catalyst 38 is carried in a dense state on the surface of the small-diameter carbon 37.

The carbons 36, 37 are included in the positive electrode layer 13 so that they shift from a dense state to a sparse state from the electrolyte membrane 12 vicinity toward the positive electrode diffusion layer 15. That is, in the positive electrode layer 13, the electrolyte/carbon weight ratio and the carried amount of the catalyst 38 are gradually decreased from the electrolyte membrane 12 vicinity toward the positive electrode diffusion layer 15 as shown by the first arrow 25.

Here, in the electrolyte membrane 12 vicinity of the positive electrode layer 13 it is necessary to suppress the drainability of product water to ensure water content of the electrolyte membrane 12. On the other hand, in the positive electrode diffusion layer 15 vicinity of the positive electrode layer 13 it is necessary to raise the product water drainability and drain the product water in the positive electrode layer 13 efficiently. Therefore, the pore-forming material amount, the pore-forming volatile solvent and the water-repellent resin amount included in the positive electrode layer 13 are gradually increased from the electrolyte membrane 12 side of the positive electrode layer 13 forward the positive electrode diffusion layer 15 direction as shown by the fourth arrow 30.

Figure 5A:
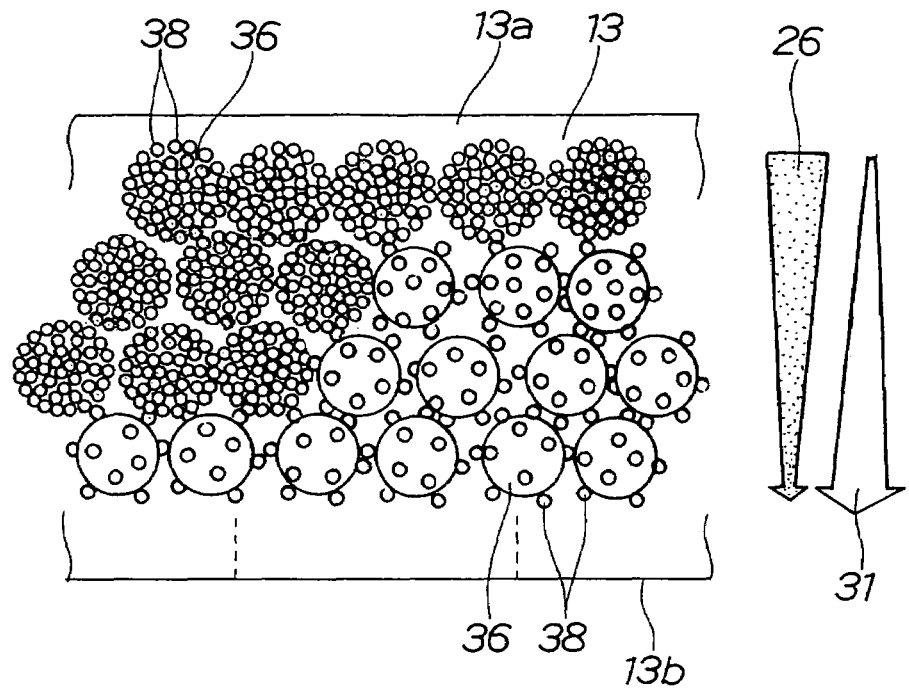
FIG. 5A shows carbon and carried catalyst amount included from the top part of the positive electrode layer toward the bottom part.
Figure 5B:
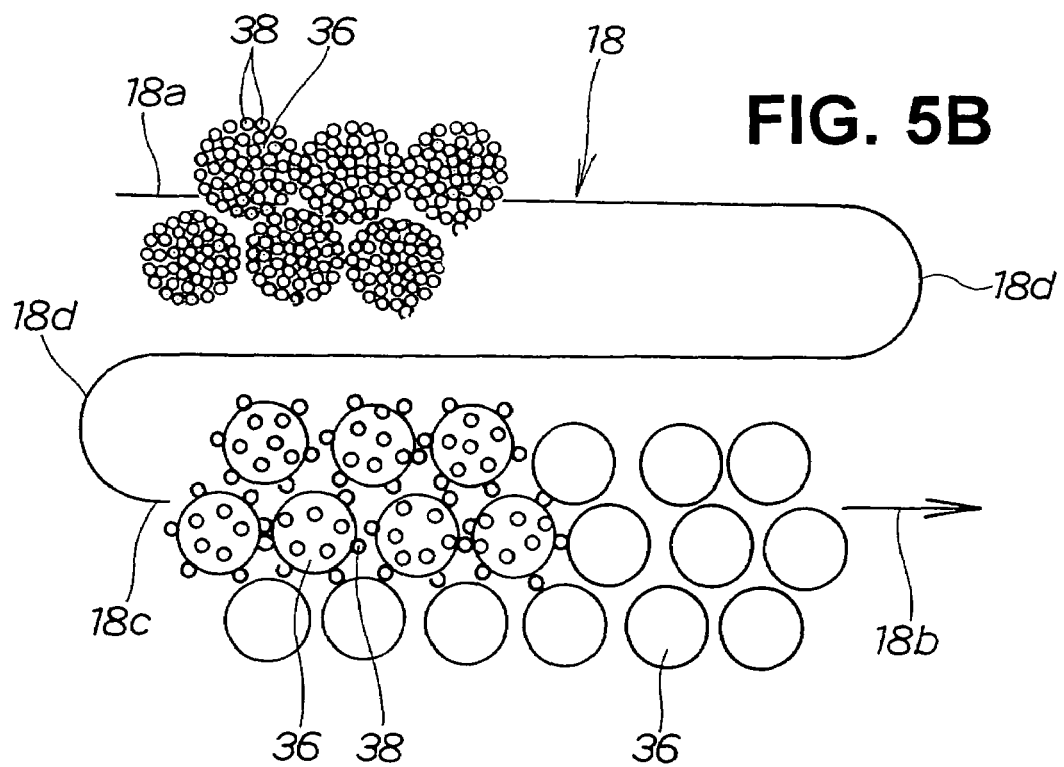
FIG. 5B shows carbon and carried catalyst amount from the supply side of an oxygen gas passage toward the discharge side.

FIG. 5A and FIG. 5B show the states in the vertical direction of the components included in the positive electrode layer 13.

FIG. 5A shows the electrolyte/carbon weight ratio and the carried amount of the catalyst 38 having been gradually decreased from the vertical-direction top 13a of the positive electrode layer 13 toward the bottom 13b.

Specifically, catalyst 38 carried in a dense state on the surface of large-diameter carbon 36 is included so as to gradually decrease from the top 13a of the positive electrode layer 13 toward the bottom 13b, and catalyst 38 included in a sparse state on the surface of large-diameter carbon 36 is included so as to increase from the top 13a of the positive electrode layer 13 toward the bottom 13b.

Thus, in the positive electrode layer 13, the electrolyte/carbon weight ratio and the carried amount of the catalyst 38 are gradually decreased from the vertical-direction top 13a to the bottom 13b as shown by the second arrow 26.

Now, at the bottom 13b of the positive electrode layer 13, product water tends to collect under its own weight. Because of this, at the bottom 13b of the positive electrode layer 13 it is necessary to raise the drainability of the product water to drain product water efficiently. Therefore, the pore-forming material amount, the pore-forming volatile solvent and the water-repellent resin amount included in the positive electrode layer 13 are gradually increased from the vertical-direction top 13a of the positive electrode layer 13 toward the bottom 13b.

FIG. 5B shows the electrolyte/carbon weight ratio and the carried amount of the catalyst 38 having been gradually decreased from the supply side 18a of the oxygen gas passage 18 toward the discharge side 18b.

Specifically, catalyst 38 carried in a dense state on the surface of large-diameter carbon 36 is included in the supply side 18a of the oxygen gas passage 18, catalyst 38 carried in a sparse state on the surface of large-diameter carbon 36 is included in a middle part 18c of the oxygen gas passage 18, and large-diameter carbon 36 carrying no catalyst 38 is included in the discharge side 18b of the oxygen gas passage 18. That is, in the positive electrode layer 13, the electrolyte/carbon weight ratio and the carried amount of the catalyst 38 are gradually decreased from the supply side 18a of the oxygen gas passage 18 toward the discharge side 18b as shown by the third arrow 27 (see FIG. 3).

Some of the product water in the positive electrode layer 13 transpires into the oxygen gas passage 18 and moves together with the oxygen gas.

The oxygen gas tends to stagnate in the bend parts 18d of the oxygen gas passage 18, and the flow of oxygen gas in the bend parts 18b of the oxygen gas passage 18 tends to decrease. Therefore, product water tends to collect in the bend parts 18b of the oxygen gas passage 18. Because of this, in the bend parts 18b of the oxygen gas passage 18 it is necessary to raise the product water drainability to drain the product water efficiently. Accordingly, the pore-forming material amount, the pore-forming volatile solvent and the water-repellent resin amount included in the positive electrode layer 13 are gradually increased from the supply side 18a of the oxygen gas passage 18 toward the discharge side 18b as shown by the sixth arrow 32 (see FIG. 3).

As shown in FIG. 4B, FIG. 5A and FIG. 5B, the electrolyte/carbon weight ratio and the carried amount of the catalyst 38 are decreased from the electrolyte membrane 12 side of the positive electrode layer 13 forward the positive electrode diffusion layer 15 direction, decreased from the vertical-direction top 13a of the positive electrode layer 13 in the direction of the bottom 13b, and decreased from the supply side 18a of the oxygen gas passage 18 toward the discharge side 18b.

In this way, in parts where the electrolyte/carbon weight ratio and the carried amount of the catalyst 38 are needed in large amounts these components are included in large amounts, and the generation efficiency of the parts is raised.

Also, in parts where the electrolyte/carbon weight ratio and the carried amount of the catalyst 38 are only needed in small amounts these components are included in small amounts. Thus, these components being included in excess is prevented. By this means it is possible to keep the included amounts of the components constituting the positive electrode layer 13 to the necessary minimum.

On the other hand, the pore-forming material amount and the water-repellent resin amount are increased from the electrolyte membrane 12 side of the positive electrode layer 13 in the direction of the positive electrode diffusion layer 15, increased from the vertical-direction top 13a of the positive electrode layer 13 in the direction of the bottom 13b, and increased from the supply side 18a of the oxygen gas passage 18 toward the discharge side 18b.

That is, by the pore-forming material amount and the water-repellent resin amount being included suitably in each of the parts of the positive electrode layer 13, the drainability of product water in the parts is suitably adjusted. By this means, in parts where the pore-forming material amount and the water-repellent resin amount are needed to be large, these components can be included in large amounts and the generation efficiency of the parts can be raised.

Also, in parts where the pore-forming material amount and the water-repellent resin amount are only needed to be small, by these components being included in small amounts, these components are prevented from being included in excess. By this means it is possible to keep the included amounts of the components constituting the positive electrode layer to the necessary minimum.

Embodiments

Specific examples of fuel cells will now be described on the basis of FIG. 6A through FIG. 7G. As the composition of the positive electrode layer, 10 compositions A through J were prepared. The compositions A through J are shown in detail in Table 1 and FIG. 6A through FIG. 6E.

TABLE 1

| COMPOSITION OF POSITIVE ELECTRODE LAYER | COMPONENT PROPORTION | | | | |
|---|---|---|---|---|---|
| | ELECTROLYTE/ CARBON WEIGHT RATIO | PORE-FORMING MATERIAL PROPORTION (WT %) | PORE-FORMING VOLATILE SOLVENT PROPORTION (WT %) | WATER-REPELLENT RESIN PROPORTION (WT %) | CARRIED CATALYST PROPORTION (WT %) |
| A | 2.0 | 5.0 | 0 | 0 | 49.1 |
| B | 1.8 | 7.3 | 7.5 | 4.8 | 48.1 |
| C | 1.6 | 9.5 | 14.0 | 9.4 | 47.2 |
| D | 1.4 | 11.6 | 19.9 | 13.7 | 46.2 |
| E | 1.2 | 13.6 | 25.1 | 17.9 | 45.7 |
| F | 1.0 | 15.5 | 29.8 | 21.9 | 44.6 |
| G | 0.9 | 17.3 | 32.8 | 23.6 | 43.1 |
| H | 0.8 | 19.1 | 35.6 | 25.2 | 41.0 |
| I | 0.7 | 20.8 | 38.1 | 26.7 | 38.4 |
| J | 0.6 | 22.4 | 40.6 | 28.2 | 35.3 |

The pore-forming material and water-repellent resin proportions are proportions in the solid part.

The pore-forming volatile solvent proportions are proportions in the solvent.

Here, the respective proportions of the pore-forming material and the water-repellent resin amount shown in FIG. 1 show proportions in the solid part. Proportions in the solid part means, of the overall weight of solid part per unit volume forming the electrode, the proportions of the weight accounted for by the respective materials.

The proportion of the pore-forming volatile solvent shows proportion in the solvent. Proportion in the solvent means, of the overall weight of solvent used when forming unit volume of the electrode, the weight proportion of the pore-forming volatile solvent.

As the components of composition A, the electrolyte/carbon weight ratio was made 2.0, the proportion of pore-forming material 5.0, the proportion of the pore-forming volatile solvent 0, the proportion of water-repellent resin amount 0, and the proportion of carried catalyst 49.1.

As the components of composition B, the electrolyte/carbon weight ratio was made 1.8, the proportion of pore-forming material 7.3, the proportion of the pore-forming volatile solvent 7.5, the proportion of water-repellent resin amount 4.8, and the proportion of carried catalyst 48.1.

As the components of composition C, the electrolyte/carbon weight ratio was made 1.6, the proportion of pore-forming material 9.5, the proportion of the pore-forming volatile solvent 14.0, the proportion of water-repellent resin amount 9.4, and the proportion of carried catalyst 47.2.

As the components of composition D, the electrolyte/carbon weight ratio was made 1.4, the proportion of pore-forming material 11.6, the proportion of the pore-forming volatile solvent 19.9, the proportion of water-repellent resin amount 13.7, and the proportion of carried catalyst 46.2.

As the components of composition E, the electrolyte/carbon weight ratio was made 1.2, the proportion of pore-forming material 13.6, the proportion of the pore-forming volatile solvent 25.1, the proportion of water-repellent resin amount 17.9, and the proportion of carried catalyst 45.7.

As the components of composition F, the electrolyte/carbon weight ratio was made 1.0, the proportion of pore-forming material 15.5, the proportion of the pore-forming volatile solvent 29.8, the proportion of water-repellent resin amount 21.9, and the proportion of carried catalyst 44.6.

As the components of composition G, the electrolyte/carbon weight ratio was made 0.9, the proportion of pore-forming material 17.3, the proportion of the pore-forming volatile solvent 32.8, the proportion of water-repellent resin amount 23.6, and the proportion of carried catalyst 43.1.

As the components of composition H, the electrolyte/carbon weight ratio was made 0.8, the proportion of pore-forming material 19.1, the proportion of the pore-forming volatile solvent 35.6, the proportion of water-repellent resin amount 25.2, and the proportion of carried catalyst 41.0.

As the components of composition I, the electrolyte/carbon weight ratio was made 0.7, the proportion of pore-forming material 20.8, the proportion of the pore-forming volatile solvent 38.1, the proportion of water-repellent resin amount 26.7, and the proportion of carried catalyst 38.4.

As the components of composition J, the electrolyte/carbon weight ratio was made 0.6, the proportion of pore-forming material 22.4, the proportion of the pore-forming volatile solvent 40.6, the proportion of water-repellent resin amount 28.2, and the proportion of carried catalyst 35.3.

Figure 6A:
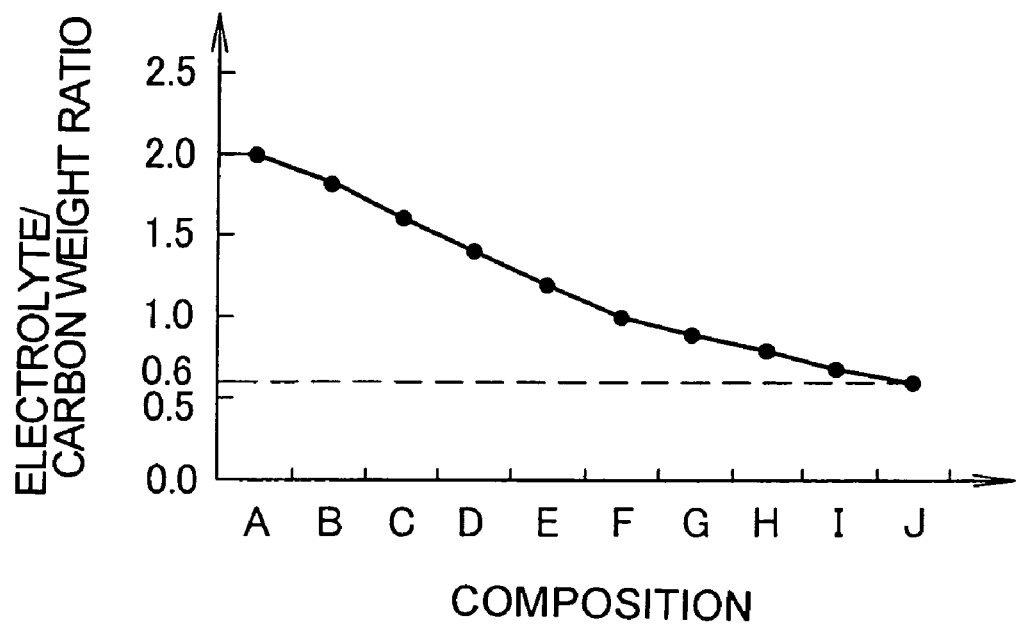
FIG. 6A through FIG. 6E are graphs showing electrolyte/carbon weight ratio, pore-forming material proportion, pore-forming volatile solvent proportion, water-repellent resin proportion and catalyst proportion of different compositions.

FIG. 6A shows the electrolyte/carbon weight ratio included in the positive electrode layer for each of the compositions shown in FIG. 1.

As shown in FIG. 6A, the electrolyte/carbon weight ratio was set in the range of 0.6 to 2.0 (see also Table 1).

When the electrolyte/carbon weight ratio is less than 0.6, the covering of the carbon by the electrolyte is insufficient and a full reaction is not obtained. When on the other hand the electrolyte/carbon weight ratio exceeds 2.0, the electrolyte component is too great and blocks diffusion paths of product water, and also water retentiveness becomes too high, and a full reaction is not obtained. For these reasons, the electrolyte/carbon weight ratio included in the positive electrode layer was set in the range of 0.6 to 2.0.

Figure 6B:
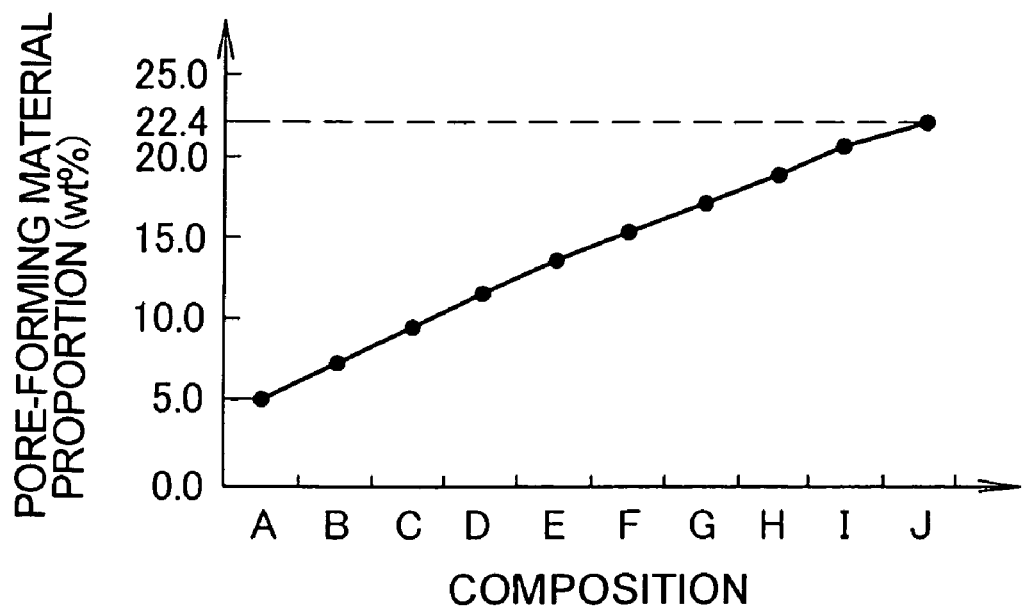

FIG. 6B shows the proportion of pore-forming material included in the positive electrode layer for each of the compositions shown in Table 1.

As shown FIG. 6B, the proportion of pore-forming material was set in the range of 5.0 to 22.4 wt % (see also Table 1).

When the proportion of pore-forming material is less than 5.0 wt %, the diffusability of the oxygen gas becomes insufficient and it is difficult to obtain a full generation reaction. When on the other hand the proportion of the pore-forming material exceeds 22.4 wt %, the amount of binder in the positive electrode layer 13 is deficient and it is difficult to ensure strength of the positive electrode layer 13. Also, because the amount of binder in the positive electrode layer 13 is deficient, it may also happen that the bonding of the components in the positive electrode layer 13 becomes incomplete. For these reasons, the proportion of the pore-forming material included in the positive electrode layer was set in the range of 5.0 to 22.4 wt %.

Figure 6C:
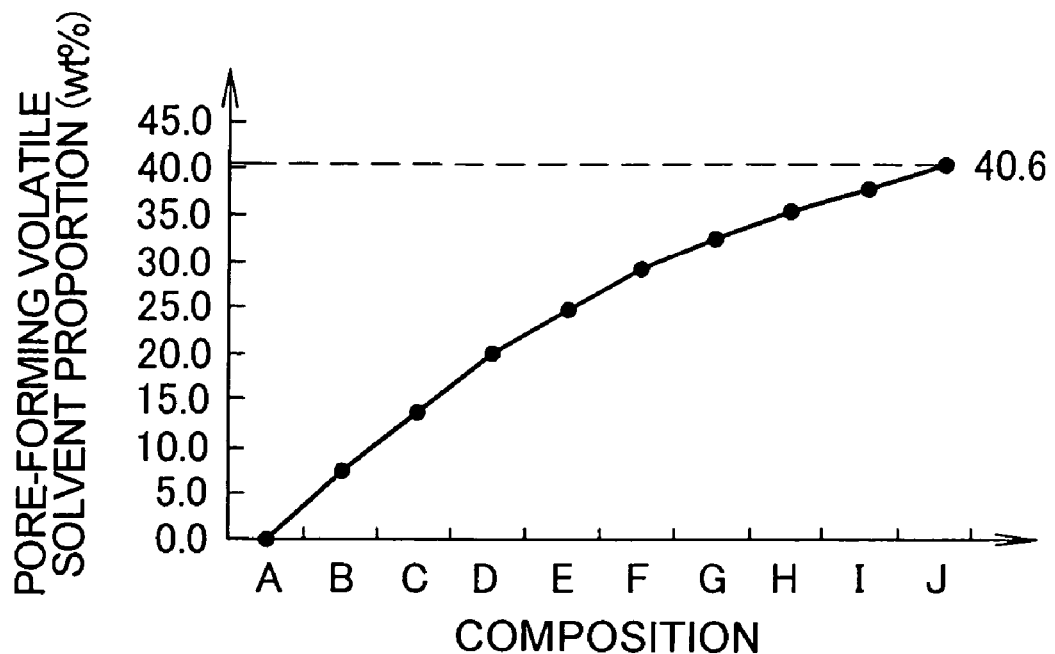

FIG. 6C shows the proportion of the pore-forming volatile solvent included in the positive electrode layer for each of the compositions shown in Table 1.

As shown FIG. 6C, the proportion of the pore-forming volatile solvent was set in the range of 0 to 40.6 wt % (see also Table 1).

In the vicinity of the face 34 in contact with the electrolyte membrane 12, because water retentivity is required, the lower limit of the proportion of pore-forming volatile solvent was made 0 wt %. On the other hand, when the proportion of pore-forming volatile solvent exceeds 40.6 wt %, as with the pore-forming material, the amount of binder in the positive electrode layer 13 is deficient and it is difficult to ensure strength of the positive electrode layer 13. Also, because the amount of binder in the positive electrode layer 13 is deficient, it may also happen that the bonding of the components in the positive electrode layer 13 becomes incomplete. For these reasons, the proportion of pore-forming volatile solvent included in the positive electrode layer was set in the range of 0 to 40.6 wt %.

Figure 6D:
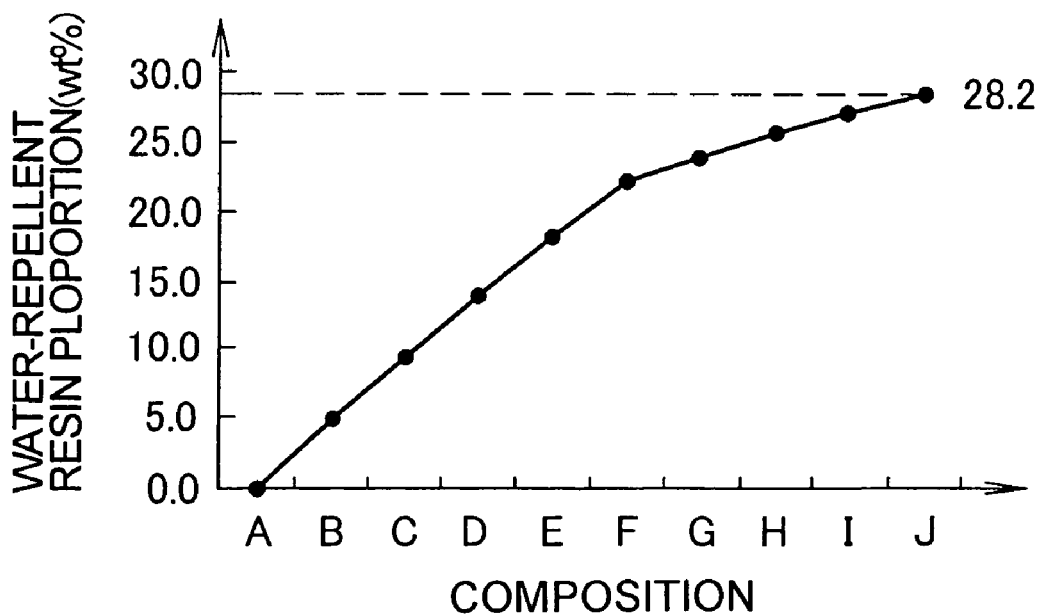

FIG. 6D shows the proportion of water-repellent resin included in the positive electrode layer for each of the compositions shown in Table 1.

As shown in FIG. 6D, the proportion of water-repellent resin was set in the range of 0 to 28.2 wt % (see also Table 1).

In the vicinity of the face 34 in contact with the electrolyte membrane 12, because water retentivity is needed, the lower limit of the proportion of water-repellent resin was made 0 wt %. On the other hand, when the proportion of water-repellent resin exceeds 40.6 wt %, there is a risk of the amount of resin being too great and obstructing the formation of pores. For these reasons, the proportion of water-repellent resin included in the positive electrode layer was set in the range of 0 to 40.6 wt %.

As a binder function the amounts of the electrolyte (ion exchange resin) and the water-repellent resin were controlled to a constant.

Figure 6E:
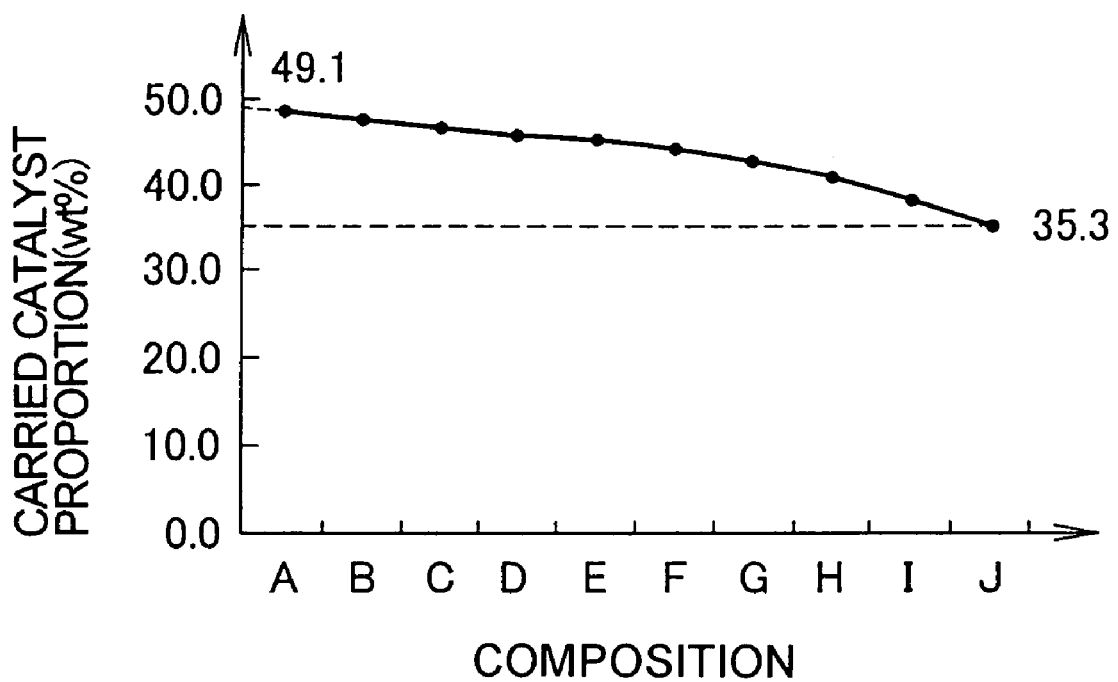

FIG. 6E shows the proportion of carried catalyst included in the positive electrode layer for each of the compositions shown in Table 1.

As shown in FIG. 6E, the carried catalyst proportion was set in the range of 35.3 to 49.1 wt % (see also Table 1).

When the carried catalyst proportion is less than 35.3 wt %, the overall amount of catalyst is less than that needed for reaction, and unreacted oxygen arises. On the other hand, when the carried catalyst proportion exceeds 49.1 wt %, the amount of catalyst is too great and some catalyst does not contribute to reaction. For these reasons, the carried catalyst proportion included in the positive electrode layer was set in the range of 35.3 to 49.1 wt %.

Figure 7D:
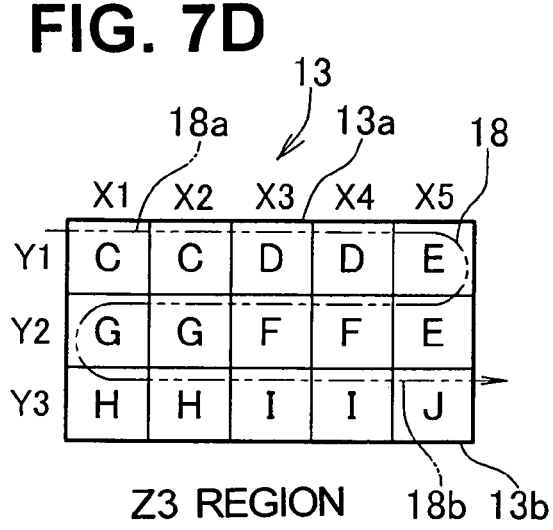

FIG. 7A through FIG. 7G show an arrangement of compositions constituting a positive electrode layer according to the first electrolyte membrane. FIG. 7A shows a positive electrode layer 13, and shows an example wherein the positive electrode layer 13 is divided into forty-five blocks by being divided into three rows (Y1, Y2, Y3) and five columns (X1, X2, X3, X4, X5) in side view and divided into three regions, a Z1 region, a Z2 region and a Z3 region, from the electrolyte membrane 12 side in the direction of the positive electrode diffusion layer 15. To specify each block of the positive electrode layer 13, for example the block shown with hatching will be expressed as Z3(X1-Y1). The other blocks will be expressed similarly.

FIG. 7B, FIG. 7C and FIG. 7D show the compositions of the regions Z1, Z2 and Z3. The compositions shown as A through J are the compositions described with reference to Table 1.

FIG. 7B is the Z1 region, i.e. the region of the positive electrode layer in contact with the electrolyte membrane, and in all of its fifteen blocks, block Z1(X1-Y1) to block Z1(X5-Y3), the composition was made A shown in Table 1.

At the region of the positive electrode layer in contact with the electrolyte membrane, a full catalytic reaction is required. Therefore, of the positive electrode layer 13, in the vicinity of the electrolyte membrane 12, to make full catalytic reaction possible, the electrolyte/carbon weight ratio and the carried catalyst amount were included as large amounts and uniformly, as explained with reference to FIG. 4A.

Also, in the region in contact with the electrolyte membrane, in order to make the catalytic reaction proceed fully, it is necessary to ensure water content of the electrolyte membrane 12. Therefore, in the vicinity of the electrolyte membrane, the pore-forming material amount, the pore-forming volatile solvent and the water-repellent resin amount were included as small amounts and uniformly.

FIG. 7C shows the Z2 region. In the Z2 region, in the three blocks block Z2(X1-Y1), block Z2(X2-Y1) and block Z2(X3-Y1), the composition was made B.

In the three blocks block Z2(X4-Y1), block Z2(X5-Y1) and block Z2(X5-Y2), the composition was made C.

In the three blocks block Z2(X2-Y2), block Z2(X3-Y2) and block Z2(X4-Y2), the composition was made D.

In the three blocks block Z2(X1-Y2 ), block Z2(X1-Y3) and block Z2(X2-Y3), the composition was made E.

In the three blocks block Z2(X3-Y3), block Z2(X4-Y3) and block Z2(X5-Y3), the composition was made F.

FIG. 7D shows the Z3 region. That is, in the region in contact with the positive electrode diffusion layer, in the two blocks block Z3(X1-Y1) and block Z3(X2-Y1) the composition was made C.

In the two blocks block Z3(X3-Y1) and block Z3(X4-Y1) the composition was made D.

In the two blocks block Z3(X5-Y1) and block Z3(X5-Y2) the composition was made E.

In the two blocks block Z3(X3-Y2) and block Z3(X4-Y2) the composition was made F.

In the two blocks block Z3(X1-Y2) and block Z3(X2-Y2) the composition was made G.

In the two blocks block Z3(X1-Y3) and block Z3(X2-Y3) the composition was made H.

In the two blocks block Z3(X3-Y3) and block Z3(X4-Y3) the composition was made I.

In the block Z3(X5-Y3), the composition was made J.

By this means, among the components constituting the Z2 region and the Z3 region of the positive electrode layer 13, the electrolyte/carbon weight ratio and the carried catalyst amount were included in the positive electrode layer 13 so as to gradually decrease from the supply side 18a of the oxygen gas passage 18 toward the discharge side 18b. Thus, in blocks where it is necessary to include the electrolyte/carbon weight ratio and the carried catalyst amount in large amounts, these components are included in large amounts, and in blocks where they are only needed in small amounts these components can be included in small amounts.

Also, of the components of the blocks constituting the Z2 region and the Z3 region of the positive electrode layer 13, the pore-forming material amount, the pore-forming volatile solvent and the water-repellent resin amount were included so as to gradually increase from the supply side 18a of the oxygen gas passage 18 toward the discharge side 18b. Thus, in blocks where the pore-forming material amount, the pore-forming volatile solvent and the water-repellent resin amount are needed in large amounts, these components are included in large amounts, and in blocks where they are only needed in small amounts these components can be included in small amounts.

Of the components of the blocks constituting the Z2 region and the Z3 region of the positive electrode layer 13, the electrolyte/carbon weight ratio and the carried catalyst amount were included in the positive electrode layer 13 so as to gradually decrease from the top 13a of the positive electrode layer 13 in the vertical direction toward the bottom 13b. Thus, in blocks where the electrolyte/carbon weight ratio and the carried catalyst amount are needed in large amounts these components can be included in large amounts, and in blocks where they are only needed in small amounts these components can be included in small amounts.

Also, of the components of the blocks constituting the Z2 region and the Z3 region of the positive electrode layer 13, the pore-forming material amount, the pore-forming volatile solvent and the water-repellent resin amount gradually increase from the vertical-direction top 13a of the positive electrode layer 13 toward the bottom 13b. Thus, in blocks where the pore-forming material amount, the pore-forming volatile solvent and the water-repellent resin amount are needed in large amounts these components can be included in large amounts, and in blocks where they are only needed in small amounts these components can be included in small amounts.

Figure 7E:
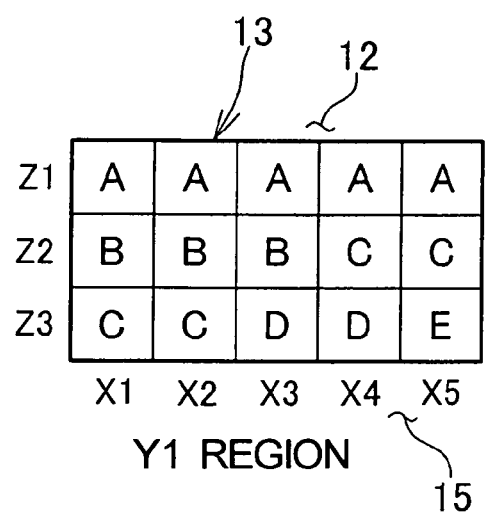
Figure 7F:
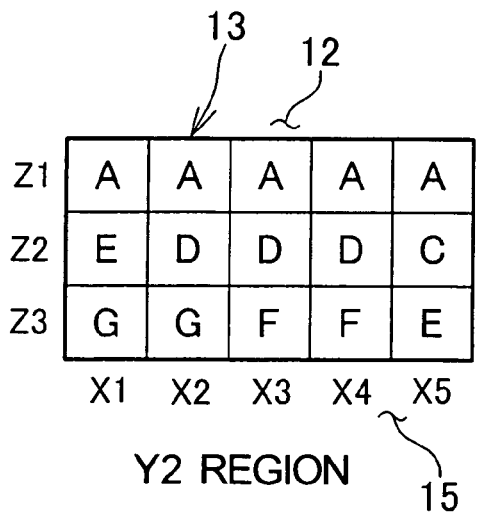
Figure 7G:
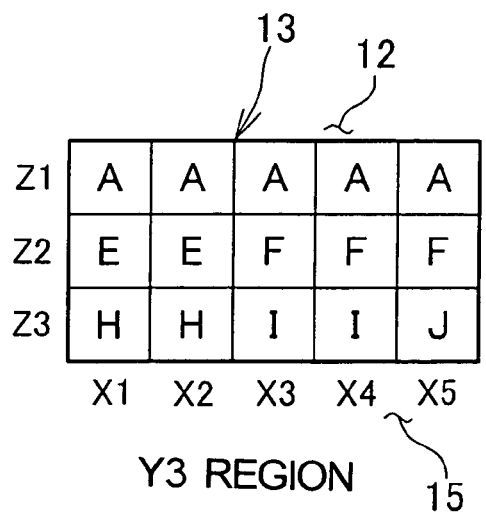

FIG. 7E, FIG. 7F and FIG. 7G show the arrangement of the compositions of the blocks of the Y1 region, the Y2 region and the Y3 region. That is, they show the regions seen from above FIG. 7A.

FIG. 7E is the Y1 region, i.e. the region constituting the top of the positive electrode layer 13, and all five of the blocks block Y1(X1-Z1) through block Y1(X5-Z1) on the electrolyte membrane 12 side were made the composition A shown in Table 1.

In the three blocks block Y1(X1-Z2), block Y1(X2-Z2) and block Y1(X3-Z2) the composition was made B.

In the four blocks block Y1(X4-Z2), block Y1(X5-Z2), block Y1(X1-Z3) and block Y1(X2-Z3) the composition was made C.

In the two blocks block Y1(X3-Z3) and block Y1(X4-Z3) the composition was made D.

Block Y1(X5-Z3) was made composition D.

FIG. 7F shows the region Y2. In the region Y2, all the five blocks block Y2(X1-Z1) to block Y2(X5-Z1) are of the composition A shown in Table 1.

Block Y2(X1-Z2) is of composition E.

The three blocks block Y2(X2-Z2), block Y2(X3-Z2) and block Y2(X4-Z2) were made composition D.

Block Y2(X5-Z2) was made composition C.

The two blocks block Y2(X1-Z3 ) and block Y2(X2-Z3) were made composition G.

The two blocks block Y2(X3-Z3) and block Y2(X4-Z3) were made composition F.

The block block Y2(X5-Z3) was made composition E.

FIG. 7G shows the region Y3, i.e. the region constituting the bottom of the positive electrode layer 13. In this region Y3, all of the five blocks block Y3(X1-Z1) to block Y3(X5-Z1) on the electrolyte membrane 12 side were made the composition A shown in Table 1.

In the two blocks block Y3(X1-Z2) and block Y3(X2-Z2) the composition was made E.

In the three blocks block Y3(X3-Z2), block Y3(X4-Z2) and block Y3(X5-Z2) the composition was made F.

In the two blocks block Y3(X1-Z3) and block Y1(X2-Z3) the composition was made H.

In the two blocks block Y3X3-Z3) and block Y3(X4-Z3) the composition was made I.

The block Y3(X5-Z3) was made the composition J.

By this means, of the components of the blocks constituting the region Y1 to the region Y3, the electrolyte/carbon weight ratio and the carried catalyst amount were included in the positive electrode layer 13 so as to gradually decrease from the electrolyte membrane 12 toward the positive electrode diffusion layer 15.Thus, in blocks where the electrolyte/carbon weight ratio and the carried catalyst amount are needed in large amounts these components can be included in large amounts, and in blocks where they are only needed in small amounts these components can be made small amounts.

Also, of the components of the blocks constituting the region Y1 to the region Y3, the pore-forming material amount, the pore-forming volatile solvent and the water-repellent resin amount were included in the positive electrode layer 13 so as to gradually increase from the electrolyte membrane 12 toward the positive electrode diffusion layer 15.Thus, in blocks where the pore-forming material amount, the pore-forming volatile solvent and the water-repellent resin amount are needed in large amounts, these components can be included in large amounts, and in blocks where they are only needed in small amounts these components can be made small amounts.

Next, the operation of a fuel cell 10 having the positive electrode layer 13 shown in FIG. 7A to FIG. 7G will be described, on the basis of FIG. 8 to FIG. 11B.

Figure 8:
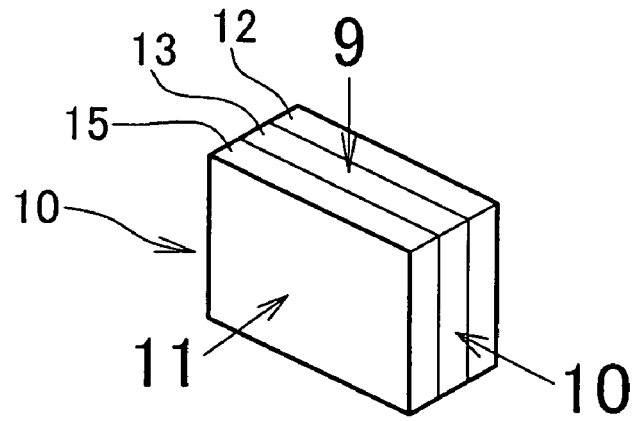
FIG. 8 is a simple perspective view showing the electrolyte membrane, the positive electrode layer and the positive electrode diffusion layer of the first embodiment.

FIG. 8 shows the fuel cell 10 of the first embodiment, with a positive electrode layer 13 disposed on an electrolyte membrane 12 and a positive electrode diffusion layer 15 disposed on the positive electrode layer 13.

Figure 9:
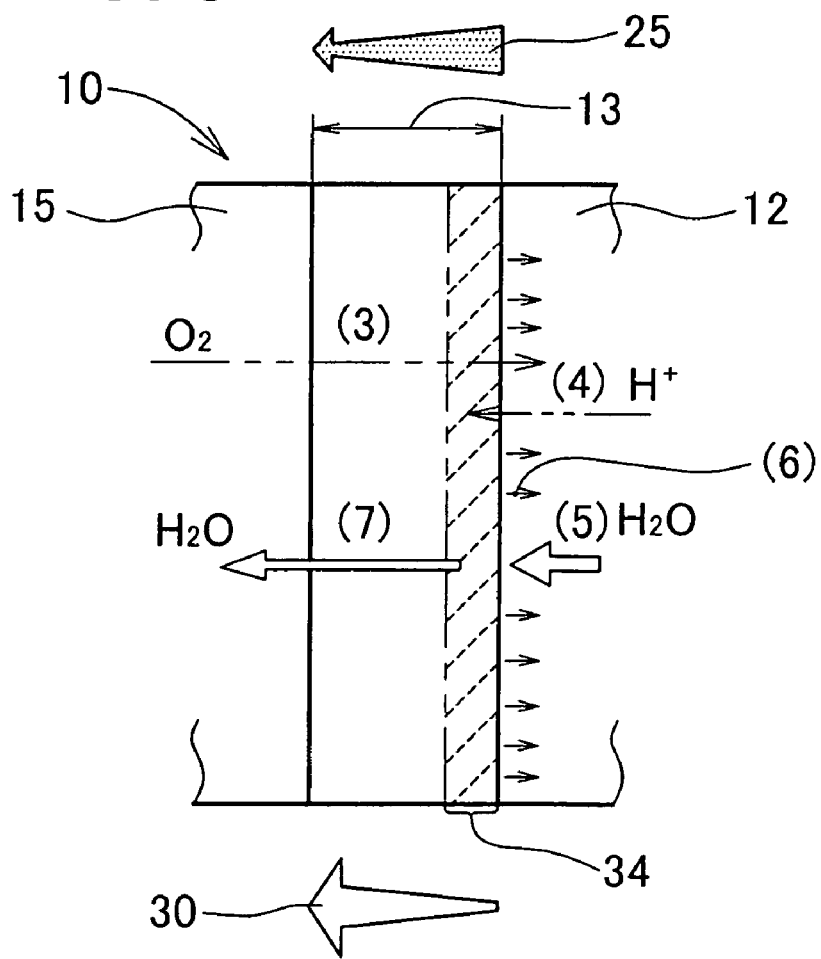
FIG. 9 is a view in the direction of the arrow 9 in FIG. 8, and is a schematic view illustrating a reaction between oxygen and hydrogen ions, and product water.

FIG. 9 is a schematic view of the fuel cell 10 shown in FIG. 8 as seen in the direction of the arrow 9, and shows the reaction of oxygen and hydrogen ions.

As shown in FIG. 9, via the positive electrode diffusion layer 15 oxygen ($O_2$) enters the positive electrode layer 13 as shown by the arrow (3), and the entering oxygen ($O_2$) goes into the electrolyte membrane 12 from inside the positive electrode layer 13.

Meanwhile, hydrogen ions ($H^+$) produced in a reaction in the negative electrode layer 14 (see FIG. 2) pass through the electrolyte membrane 12 and enter the positive electrode layer 13 as shown by the arrow (4). Consequently, the hydrogen ions ($H^+$) and the oxygen ($O_2$) react and product water is produced.

The reaction between the hydrogen ions ($H^+$) and the oxygen ($O_2$) proceeds particularly at the face 34 of the positive electrode layer 13, in contact with the electrolyte membrane 12 (the region shown with dashed-line hatching).

So, at the face 34 of the positive electrode layer 13 in contact with the electrolyte membrane 12, the electrolyte/carbon weight ratio is made large and the carried catalyst amount is included in a large amount, and they are included uniformly. Thus, at the face 34 in contact with the electrolyte membrane 12 it is possible to promote the electrode reaction amply.

Also, at the face 34 in contact with the electrolyte membrane 12, the pore-forming material amount, the pore-forming volatile solvent and the water-repellent resin amount are included in small amounts and are included uniformly, whereby the drainability of the face 34 in contact with the electrolyte membrane 12 is suppressed.

Consequently, when the hydrogen ions ($H^+$) and the oxygen ($O_2$) react and produced product water enters the positive electrode layer 13 as shown by the arrow (5), some of the product water returns toward the electrolyte membrane 12 as shown by the arrow (6).

By this means it is possible to keep the electrolyte membrane 12 in a suitable wet state and promote the reaction between the hydrogen ions ($H^+$) and the oxygen ($O_2$) still more.

The reaction between the hydrogen ions ($H^+$) and the oxygen ($O_2$) is gradually suppressed from the electrolyte membrane 12 side in the direction of the positive electrode diffusion layer 15. Accordingly, in correspondence with the reaction state between the hydrogen ions ($H^+$) and the oxygen ($O_2$), the electrolyte/carbon weight ratio and the carried catalyst amount were gradually decreased from the electrolyte membrane 12 side in the direction of the positive electrode diffusion layer 15 as shown by the first arrow 25. Thus it is possible to reduce the electrolyte, carbon and carried catalyst amounts without having an adverse effect on the reaction between the hydrogen ions ($H^+$) and the oxygen ($O_2$).

Also, to let product water escape toward the positive electrode diffusion layer 15 as shown by the arrow (7), it is necessary for the drainability of the positive electrode diffusion layer 15 to be gradually raised from the electrolyte membrane 12 side toward the positive electrode diffusion layer 15. So, in correspondence with the drainability, as shown by the fourth arrow 30, the pore-forming material amount, the pore-forming volatile solvent and the water-repellent resin amount included in the positive electrode layer 13 were gradually increased from the electrolyte membrane 12 side of the positive electrode layer 13 in the direction of the positive electrode diffusion layer 15. Thus, overall, it is possible to reduce the pore-forming material amount, the pore-forming volatile solvent and the water-repellent resin amount without having an adverse effect on the drainability of product water.

Figure 10:
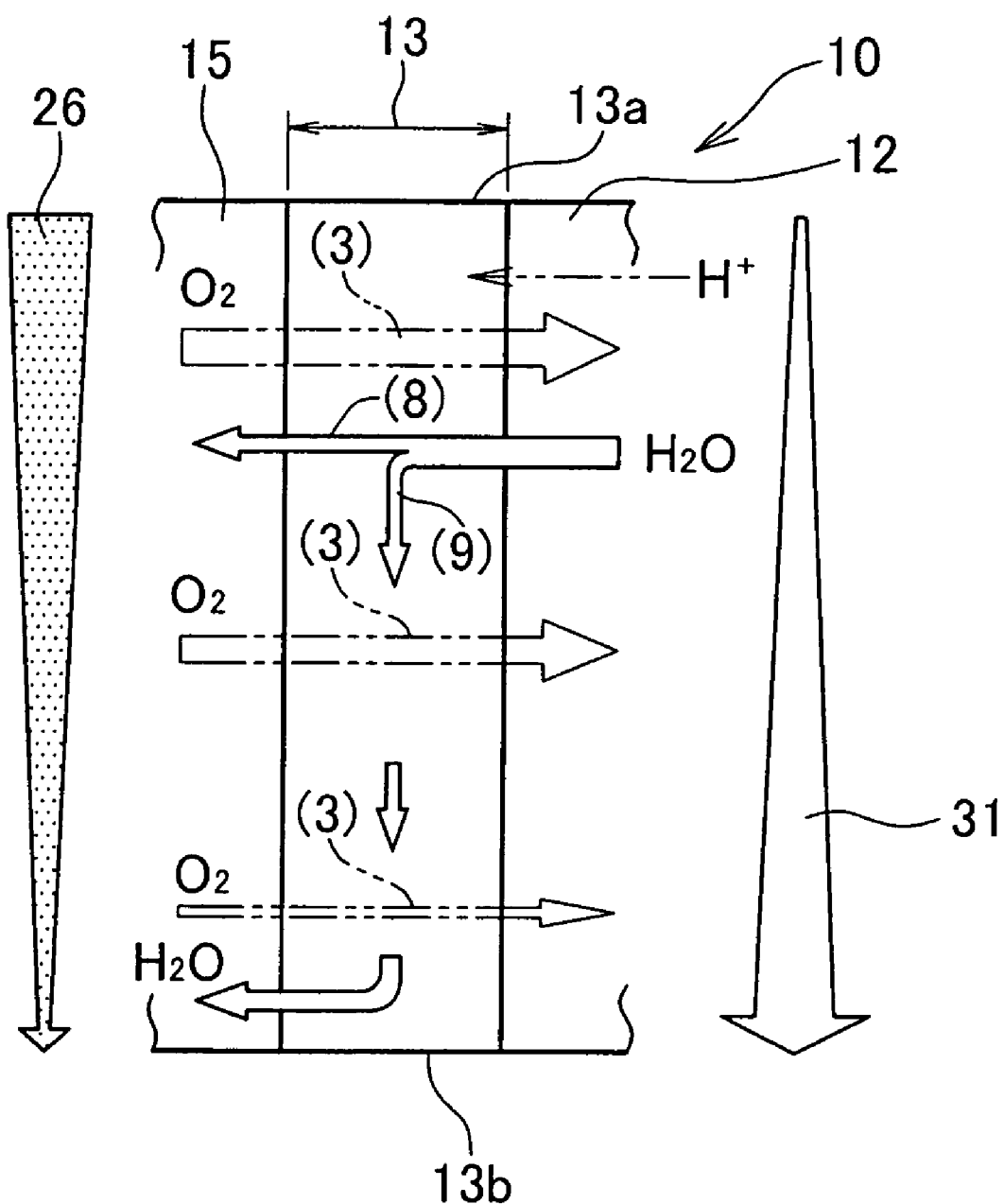
FIG. 10 is a view in the direction of the arrow 10 in FIG. 8, and is a schematic view illustrating a reaction between oxygen and hydrogen ions, and product water.

FIG. 10 is a schematic view of the fuel cell 10 shown in FIG. 8 as seen in the direction of the arrow 10, and shows the reaction of the oxygen and the hydrogen ions and the drainage state of product water.

As shown in FIG. 3, the supply side 18a of the oxygen gas passage 18 is positioned at the top 13a of the positive electrode layer 13 and the discharge side 18b is positioned at the bottom 13b. Consequently, the amount of oxygen ($O_2$) entering the positive electrode layer 13 via the positive electrode diffusion layer 15 as shown by the arrow (3) gradually decreases from the vertical-direction top 13a of the positive electrode layer 13 in the direction of the bottom 13b. As a result, the reaction between the hydrogen ions ($H^+$) and the oxygen ($O_2$) is gradually suppressed from the vertical-direction top 13a of the positive electrode layer 13 in the direction of the bottom 13b.

Accordingly, in correspondence with the reaction state between the hydrogen ions ($H^+$) and the oxygen ($O_2$), the electrolyte/carbon weight ratio and the carried catalyst amount were gradually decreased from the vertical-direction top 13a of the positive electrode layer 13 in the direction of the bottom 13b as shown by the second arrow 26. Thus it is possible to reduce the electrolyte, carbon and carried catalyst amounts without having an adverse effect on the reaction state between the hydrogen ions ($H^+$) and the oxygen ($O_2$).

Also, product water in the positive electrode layer 13 flows out to the positive electrode diffusion layer 15 as shown by the arrow (8), and other product water descends through the inside of the positive electrode diffusion layer 15 under its own weight as shown by the arrow (9). Because of this, it is necessary to make the descended product water flow out from the bottom 13b of the positive electrode layer 13 into the positive electrode diffusion layer 15 as shown with an arrow.

Consequently, to allow product water to escape efficiently toward the positive electrode diffusion layer 15, it is necessary to gradually increase the drainability of the positive electrode layer 13 from the top 13a toward the bottom 13b.

So, in correspondence with the drainability, as shown by the fifth arrow 31, the pore-forming material amount, the pore-forming volatile solvent and the water-repellent resin amount included in the positive electrode layer 13 were gradually increased from the top 13a in the direction of the bottom 13b. Thus, without having an adverse effect on the drainability of product water, it is possible overall to reduce the pore-forming material amount, the pore-forming volatile solvent and the water-repellent resin amount.

Figure 11A:
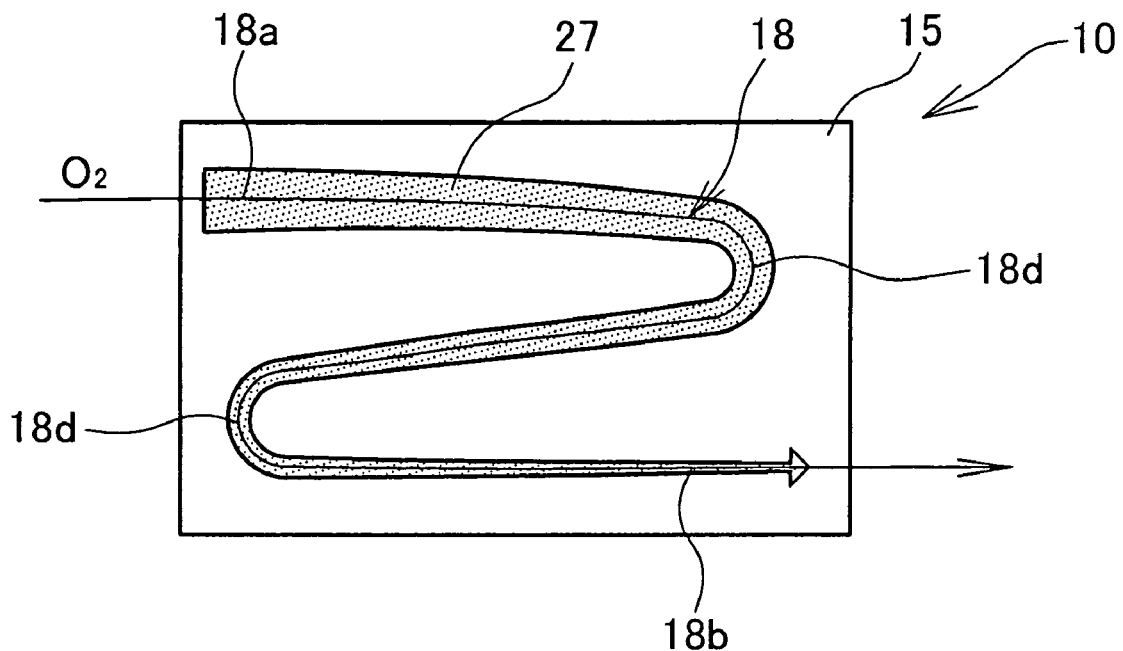
FIG. 11A and FIG. 11B are views in the direction of the arrow 11 in FIG. 8, and are schematic views illustrating electrolyte/carbon weight ratio and carried catalyst amount, and pore-forming material amount and pore-forming volatile solvent and water-repellent resin amounts.
Figure 11B:
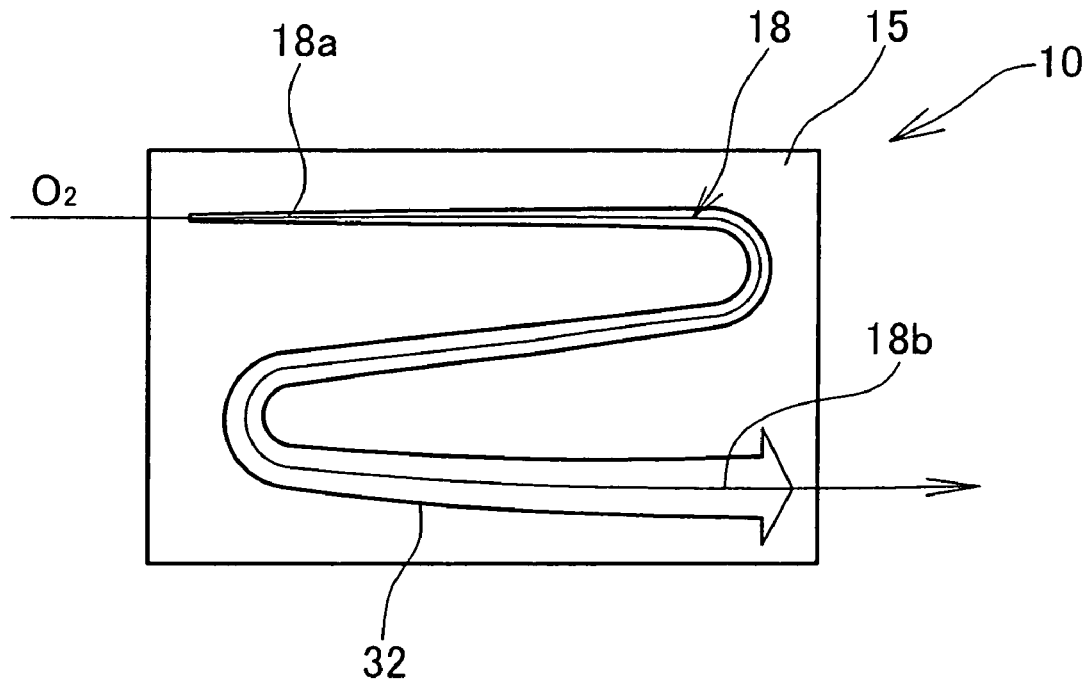

FIG. 11A and FIG. 11B are schematic views seen in the direction of the arrow 11 in FIG. 8, FIG. 11A showing the electrolyte/carbon weight ratio and the carried catalyst amount and FIG. 11B showing the pore-forming material amount, the pore-forming volatile solvent and the water-repellent resin amount.

As shown in FIG. 11A, oxygen gas flows from the supply side 18a of the oxygen gas passage 18 toward the discharge side 18b. The oxygen gas flowing in the oxygen gas passage 18 tends to stagnate in the bend parts 18d, and tends to gradually decrease toward the discharge side 18b of the oxygen gas passage 18. Because of this, the amount of oxygen ($O_2$) entering the positive electrode layer 13 via the positive electrode diffusion layer 15 (see FIG. 10) gradually decreases from the supply side 18a of the oxygen gas passage 18 toward the discharge side 18b. As a result, the reaction between the hydrogen ions ($H^+$) and the oxygen ($O_2$) is gradually suppressed from the supply side 18a of the oxygen gas passage 18 toward the discharge side 18b.

So, in correspondence with the reaction state between the hydrogen ions ($H^+$) and the oxygen ($O_2$), the electrolyte/carbon weight ratio and the carried catalyst amount were gradually decreased from the supply side 18a of the oxygen gas passage 18 to the discharge side 18b as shown by the third arrow 27. Thus, without having an adverse effect on the reaction between the hydrogen ions ($H^+$) and the oxygen ($O_2$), it is possible overall to reduce the electrolyte, carbon and carried catalyst amounts.

Also, some of the product water in the positive electrode layer 13 (see FIG. 10) transpires in the oxygen gas passage 18 and moves along with the oxygen gas.

On the other hand, the oxygen gas tends to stagnate in the bend parts 18d of the oxygen gas passage 18, and at the discharge side 18b of the oxygen gas passage 18 the flow of oxygen gas tends to decrease, and product water tends to collect in the discharge side 18b of the oxygen gas passage 18. Because of this, in the discharge side 18b of the oxygen gas passage 18 it is necessary to raise the product water drainability and drain product water efficiently.

So, as shown in FIG. 11B, the pore-forming material amount, the pore-forming volatile solvent and the water-repellent resin amount included in the positive electrode layer 13 were gradually increased from the supply side 18a of the oxygen gas passage 18 to the discharge side 18b as shown by the sixth arrow 32. Thus, without having an adverse effect on the product water drainability, it is possible overall to reduce the pore-forming material amount, the pore-forming volatile solvent and the water-repellent resin amount.

As explained with reference to FIG. 9 to FIG. 11B, in parts where the electrolyte/carbon weight ratio and the carried amount of the catalyst 38 (see FIG. 4A to FIG. 5B) are needed in large amounts, these components can be included in large amounts and the generation efficiency of the parts can be raised.

Also, in parts of the positive electrode layer 13 where the electrolyte/carbon weight ratio and the carried amount of the catalyst 38 are only needed in small amounts, these components can be included in small amounts and thereby these components being included in excess can be prevented.

By this means it is possible to keep the included amounts of the components constituting the positive electrode layer 13 to the necessary minimum.

On the other hand, in parts where the pore-forming material amount and the water-repellent resin amount are needed in large amounts, these components can be included in large amounts to raise the drainability of the respective parts of the positive electrode layer.

Also, in parts of the positive electrode layer 13 where the pore-forming material amount and the water-repellent resin amount are only needed in small amounts, by these components being included in small amounts these components being included in excess is prevented.

By this means it is possible to keep the included amounts of the components constituting the positive electrode layer 13 to the necessary minimum.

Next, a fuel cell according to a second embodiment will be described, on the basis of FIG. 12A to FIG. 12C. In the description of the second embodiment, parts the same as in the first embodiment have been given the same reference numerals and will not be described again.

Figure 12A:
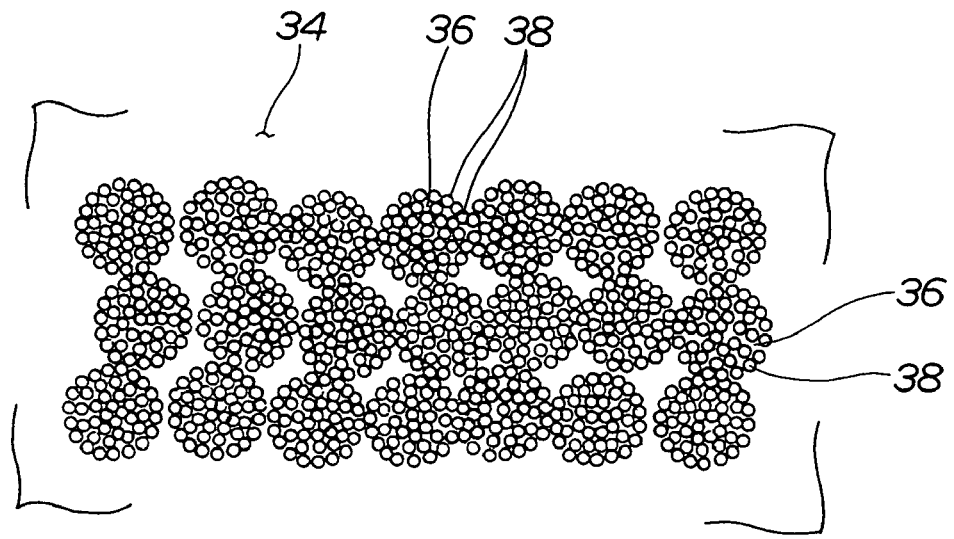
FIG. 12A through FIG. 12C are views illustrating component amounts of a positive electrode layer according to a second embodiment of the invention.

FIG. 12A shows a state of carbon and a catalyst carried on the carbon at the face 34 of the positive electrode layer 13 in contact with the electrolyte membrane (see also FIG. 3).

At the face 34 in contact with the embodiment, i.e. in the positive electrode layer in the electrolyte membrane 12 vicinity, a full catalytic reaction is required.

Therefore, to make possible a full catalytic reaction at the electrolyte membrane 12 vicinity of the positive electrode layer 13, large-diameter carbon 36 and catalyst 38 carried on this are included in large amounts and uniformly in the electrolyte membrane 12 vicinity of the positive electrode layer 13. Specifically, the catalyst 38 is carried in a dense state on the surface of the large-diameter carbon 36, and this large-diameter carbon 36 is included densely in the face 34 in contact with the electrolyte membrane.

The pore-forming material amount, the pore-forming volatile solvent and the water-repellent resin amount at the face 34 in contact with the electrolyte membrane are adjusted in the same way as in the first embodiment.

Figure 12B:
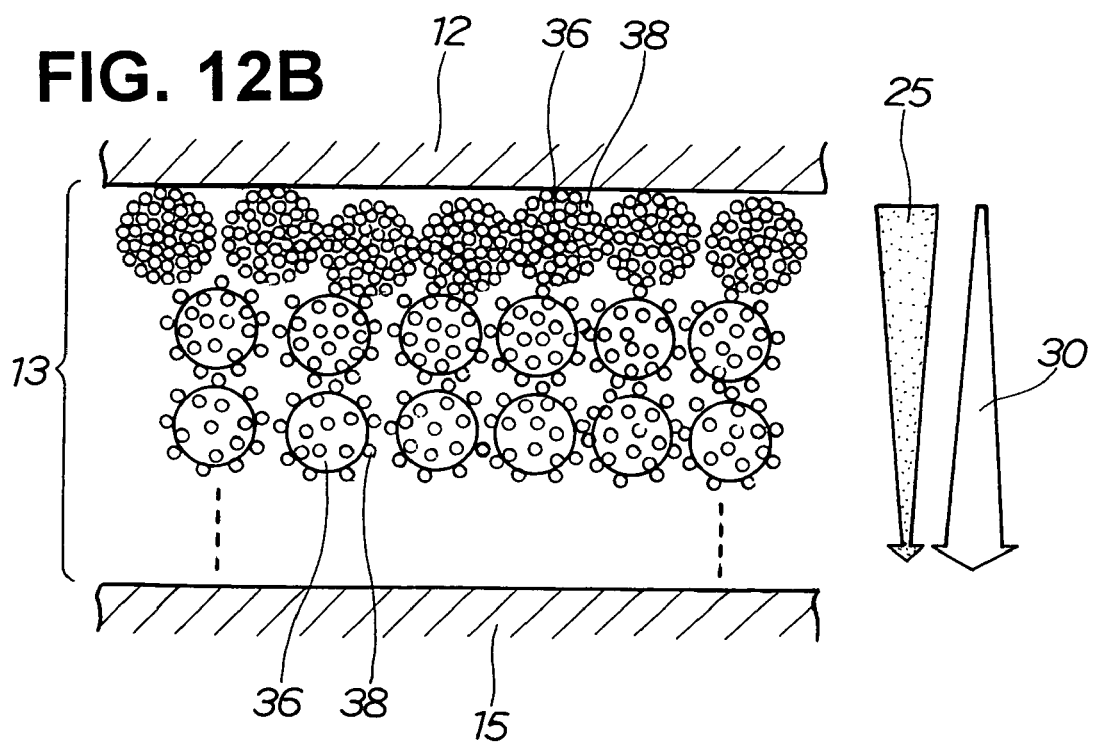

FIG. 12B shows the electrolyte/carbon weight ratio and the carried amount of the catalyst 38 in the positive electrode layer 13 having been gradually decreased from the electrolyte membrane 12 vicinity in the direction of the positive electrode diffusion layer 15. Specifically, in the positive electrode layer 13, the electrolyte/carbon weight ratio and the carried amount of the catalyst 38 on the surface of the large-diameter carbon 36 are gradually decreased from the electrolyte membrane 12 vicinity in the direction of the positive electrode diffusion layer 15 as shown by the first arrow 25.

The pore-forming material amount, the pore-forming volatile solvent and the water-repellent resin amount from the electrolyte membrane 12 side of the positive electrode layer 13 in the positive electrode diffusion layer 15 direction are adjusted in the same way as in the first embodiment.

Figure 12C:
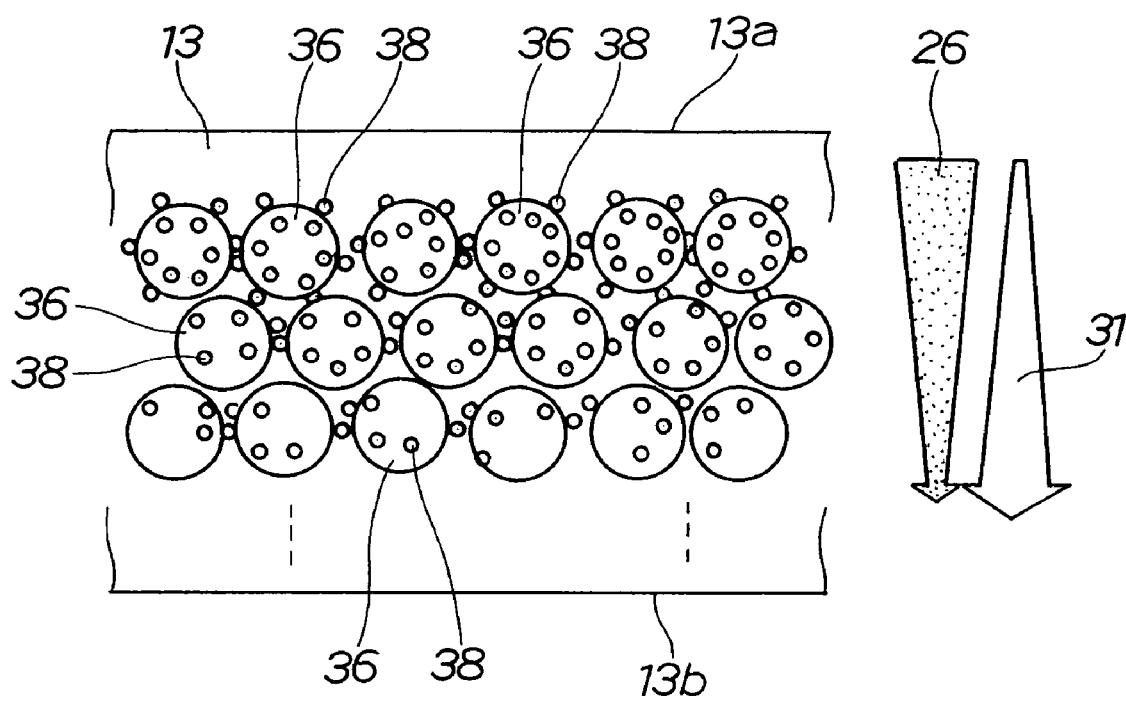

FIG. 12C shows the electrolyte/carbon weight ratio and the carried amount of the catalyst 38 having been gradually decreased from the vertical-direction top 13a of the positive electrode layer 13 toward the bottom 13b.

Specifically, the catalyst 38 carried on the large-diameter carbon 36 was included so as to gradually decrease from the vertical-direction top 13a of the positive electrode layer 13 toward the bottom 13b. Thus, in the positive electrode layer 13, the electrolyte/carbon weight ratio and the carried amount of the catalyst 38 gradually decrease from the vertical-direction top 13a toward the bottom 13b as shown by the second arrow 26.

The pore-forming material amount, the pore-forming volatile solvent and the water-repellent resin amount from the vertical-direction top 13a of the positive electrode layer 13 to the bottom 13b are adjusted in the same way as in the first embodiment.

Next, a fuel cell manufacturing method of the invention will be described, on the basis of FIG. 13 and FIG. 14A to FIG. 14D. Here, to facilitate understanding, description of a pore-forming volatile solvent will be omitted; however, it may be assumed that a pore-forming volatile solvent is applied in the same way as the pore-forming material.

Figure 13:
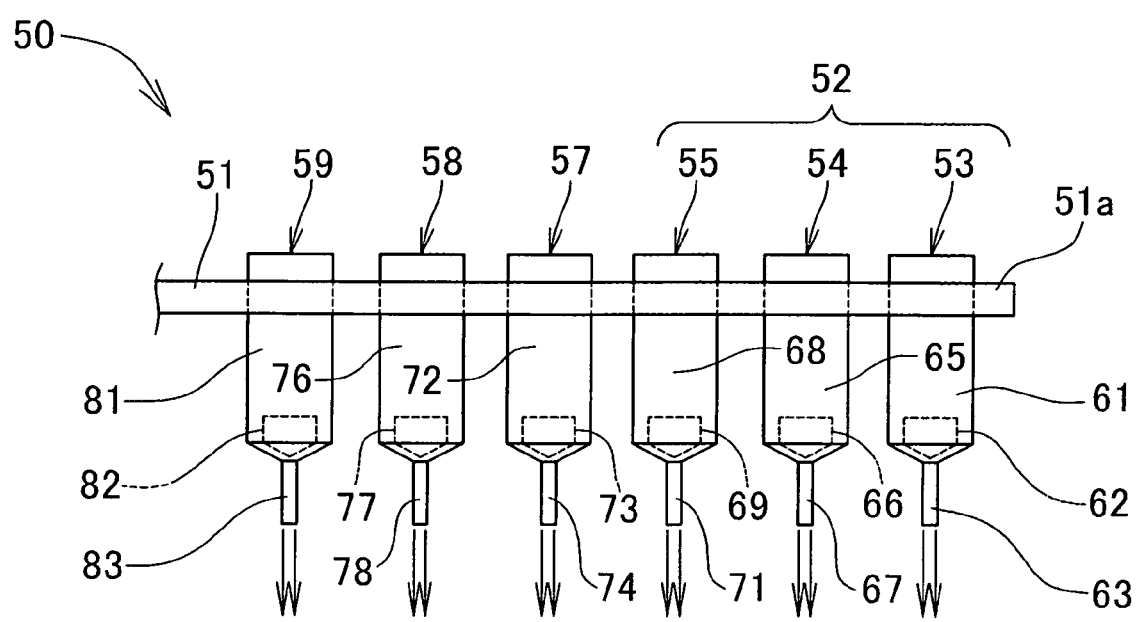
FIG. 13 is a view showing a coating apparatus for manufacturing a positive electrode layer of a fuel cell according to the invention.

FIG. 13 shows a coating apparatus for applying a positive electrode layer of a fuel cell.

This coating apparatus 50 has a holding member 51 and, held in order from a distal end 51a of the holding member 51, an electrode slurry applicator 52, an electrolyte applicator 57, a pore-forming material applicator 58 and a water-repellent resin applicator 59.

The electrode slurry applicator 52 is made up of a first electrode slurry applicator 53, a second electrode slurry applicator 54 and a third electrode slurry applicator 55.

The first electrode slurry applicator 53 holds a first electrode slurry including a large amount of catalyst in a tank 61. When a piezo pump 62 in the tank 61 is driven, the first electrode slurry is blown in droplets through a nozzle 63 in the direction of the arrows.

The second electrode slurry applicator 54 holds a second electrode slurry including a medium amount of catalyst in a tank 65. When a piezo pump 66 in the tank 65 is driven, the second electrode slurry is blown in droplets through a nozzle 67 in the direction of the arrows.

The third electrode slurry applicator 55 holds a third electrode slurry including a small amount of catalyst in a tank 68. When a piezo pump 69 in the tank 68 is driven, the third electrode slurry is blown in droplets through a nozzle 71 in the direction of the arrows.

The electrolyte applicator 57 holds an electrolyte slurry in a tank 72. When a piezo pump 73 in the tank 72 is driven, the electrolyte slurry is blown in droplets through a nozzle 74 in the direction of the arrows.

The pore-forming material applicator 58 holds a pore-forming material slurry in a tank 76. When a piezo pump 77 in the tank 76 is driven, the pore-forming material slurry is blown in droplets through a nozzle 78 in the direction of the arrows.

The water-repellent resin applicator 59 holds a water-repellent resin slurry in a tank 81. When a piezo pump 82 in the tank 81 is driven, the water-repellent resin slurry is blown in droplets through a nozzle 83 in the direction of the arrows.

With this coating apparatus 50, by respective piezo pumps 62, 66, 69, 73, 77 and 82 being used in the applicators 53, 54, 55, 57, 58 and 59, when the slurries are blown in droplets from the nozzles 63, 67, 71, 74, 78, 83, they can be applied in particle form without being dispersed.

The piezo pumps 62, 66, 69, 73, 77 and 82 are pumps using piezo devices as pump drive sources.

By the coating apparatus 50 being provided with moving means and the holding member 51 being moved continuously, the coating apparatus 50 can be moved along a positive electrode diffusion layer 15 to effect continuous coating.

FIG. 14A to FIG. 14D show steps in the manufacture of a fuel cell according to the invention.

Figure 14A:
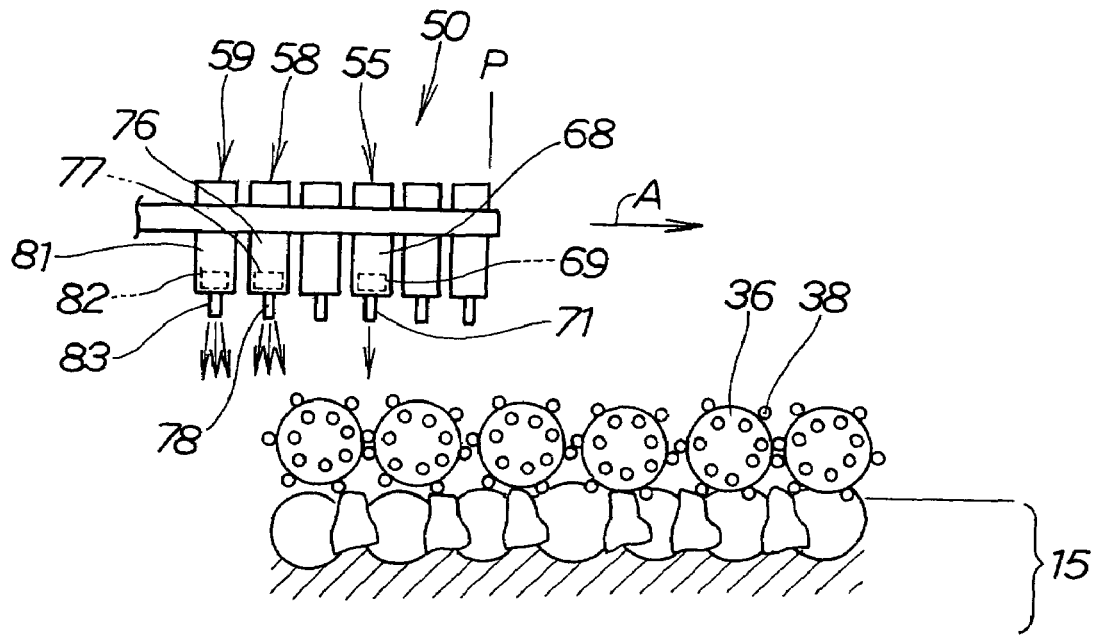
FIG. 14A through FIG. 14D are views illustrating a method for manufacturing a positive electrode layer using the coating apparatus shown in FIG. 13.

In FIG. 14A, a positive electrode diffusion layer 15 is laid, the coating apparatus 50 is disposed above the positive electrode diffusion layer 15, and the coating apparatus 50 is moved from a standby position P in the direction of the arrow A.

Along with the movement of the coating apparatus 50, the piezo pump 69 of the third electrode slurry applicator 55 is driven, and the third electrode slurry in the tank 68 is blown in droplets from the nozzle 71 as shown with arrows. As a result, a large-diameter carbon 36 carrying a catalyst 38 in a sparse state on its surface is applied to the positive electrode diffusion layer 15.

At the same time, the piezo pump 77 of the pore-forming material applicator 58 is driven, and the pore-forming material slurry in the tank 76 is blown in droplets from the nozzle 78 in a large amount as shown with arrows. Also, the piezo pump 82 of the water-repellent resin applicator 59 is driven, and the water-repellent resin slurry in the tank 81 is blown in droplets from the nozzle 83 in a large amount as shown with arrows.

By this means, along with the large-diameter carbon 36 carrying the catalyst 38 on its surface in a sparse state, a pore-forming material and a water-repellent resin are each applied to the positive electrode diffusion layer 15 in a large amount.

After completion of a first coating with the coating apparatus 50, the coating apparatus 50 is provisionally returned to the standby position P.

Figure 14B:
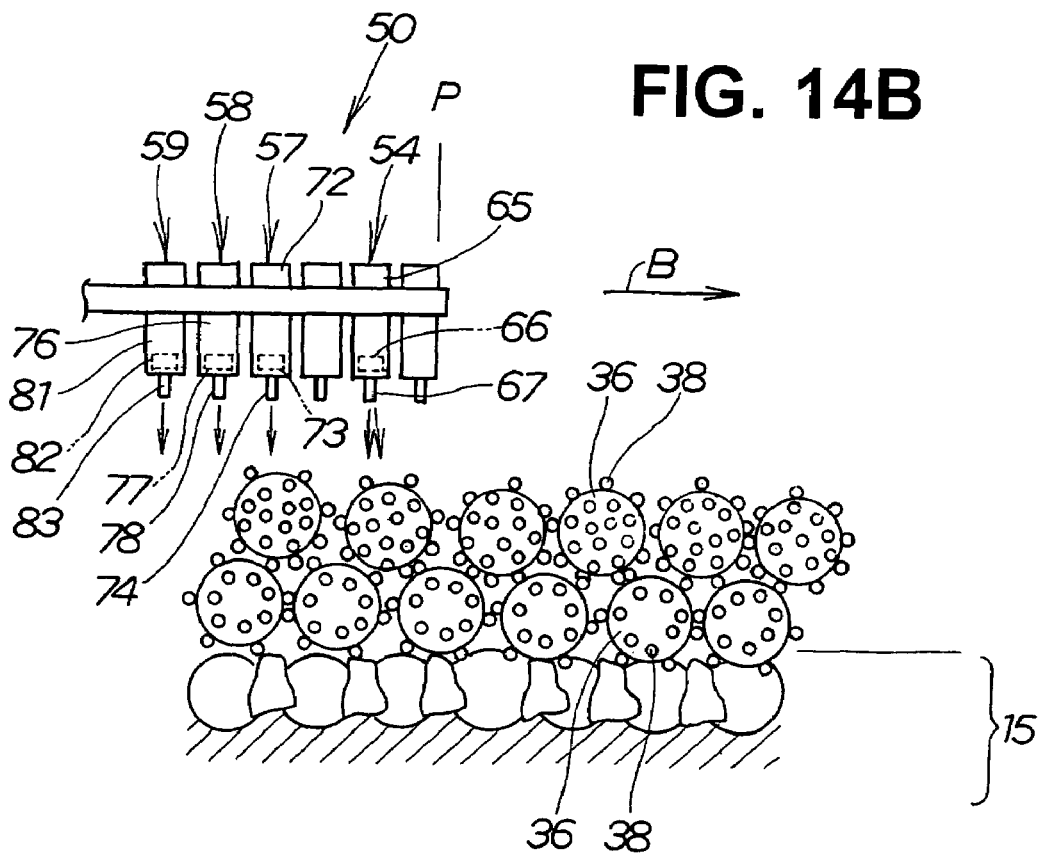

Next, as shown in FIG. 14B, the coating apparatus 50 is moved from the standby position P as shown by the arrow B.

Along with this movement of the coating apparatus 50, the piezo pump 66 of the second electrode slurry applicator 54 is driven, and the second electrode slurry in the tank 65 is blown in droplets in a medium amount as sown with arrows, that is, in a greater amount than the first electrode slurry, from the nozzle 67. By this means a large-diameter carbon 36 carrying a catalyst 38 at a medium density on its surface is applied in a medium amount, that is, in an amount greater than the first electrode slurry, to the large-diameter carbon 36 carrying the catalyst 38 on its surface in a sparse state.

At the same time, the piezo pump 73 of the electrolyte applicator 57 is driven, and the electrolyte slurry in the tank 72 is blown in droplets from the nozzle 74 as shown with arrows. Also, the piezo pump 77 of the pore-forming material applicator 58 is driven and the pore-forming material slurry in the tank 76 is blown in droplets from the nozzle 78 in a smaller amount than the pore-forming material slurry of the first time, as shown with arrows. And also the piezo pump 82 of the water-repellent resin applicator 59 is driven, and the water-repellent resin slurry in the tank 81 is blown in droplets from the nozzle 83 in a smaller amount than the water-repellent resin slurry of the first time mentioned with reference to FIG. 14A, as shown with arrows.

As a result, the large-diameter carbon 36 carrying the catalyst 38 in a sparse state is coated with the pore-forming material and the water-repellent resin in small amounts along with the large-diameter carbon 36 carrying the catalyst 38 on its surface at a medium density.

After the completion of a second coating with the coating apparatus 50, the coating apparatus 50 is returned to the standby position P again.

Figure 14C:
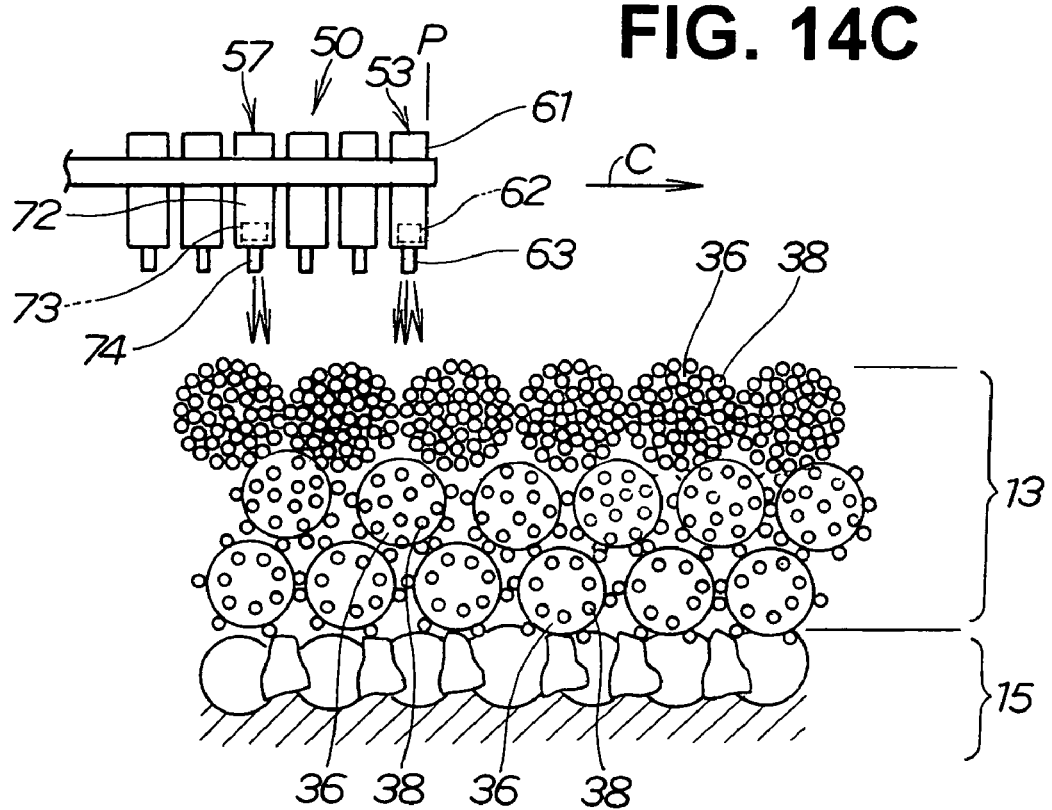

Also, as shown in FIG. 14C, the coating apparatus 50 is moved from the standby position P as shown by the arrow C.

Along with this movement of the coating apparatus 50, the piezo pump 62 of the first electrode slurry applicator 53 is driven and the first electrode slurry in the tank 61 is blown in droplets from the nozzle 63 as shown with arrows in a large amount, that is, in an amount greater than that of the second electrode slurry.

As a result, the large-diameter carbon 36 carrying the catalyst 38 on its surface in a dense state is applied in a larger amount than the second electrode slurry to the large-diameter carbon 36 carrying the catalyst 38 on its surface in a medium density.

At the same time, the piezo pump 73 of the electrolyte applicator 57 is moved and the electrolyte slurry in the tank 72 is blown in droplets from the nozzle 74 in a larger amount than the electrolyte slurry of the first time as shown with arrows.

By this means it is possible to include the electrolyte/carbon weight ratio and the carried amount of the catalyst 38 in the positive electrode layer 13 in a state such that they gradually decrease from the electrolyte membrane 12 side in the direction of the positive electrode diffusion layer 15 as shown in FIG. 12B.

Also, it is possible to include the pore-forming material amount and the water-repellent resin amount in the positive electrode layer 13 so that they gradually increase from the electrolyte membrane 12 side in the direction of the positive electrode diffusion layer 15.

Figure 14D:
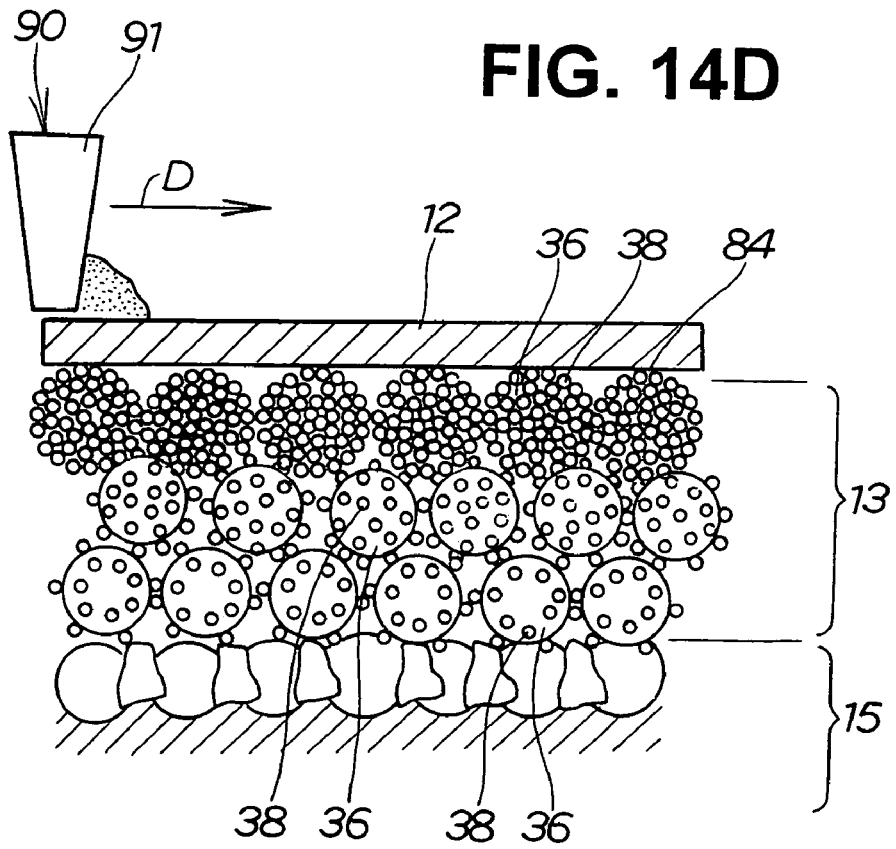
Figure 15:
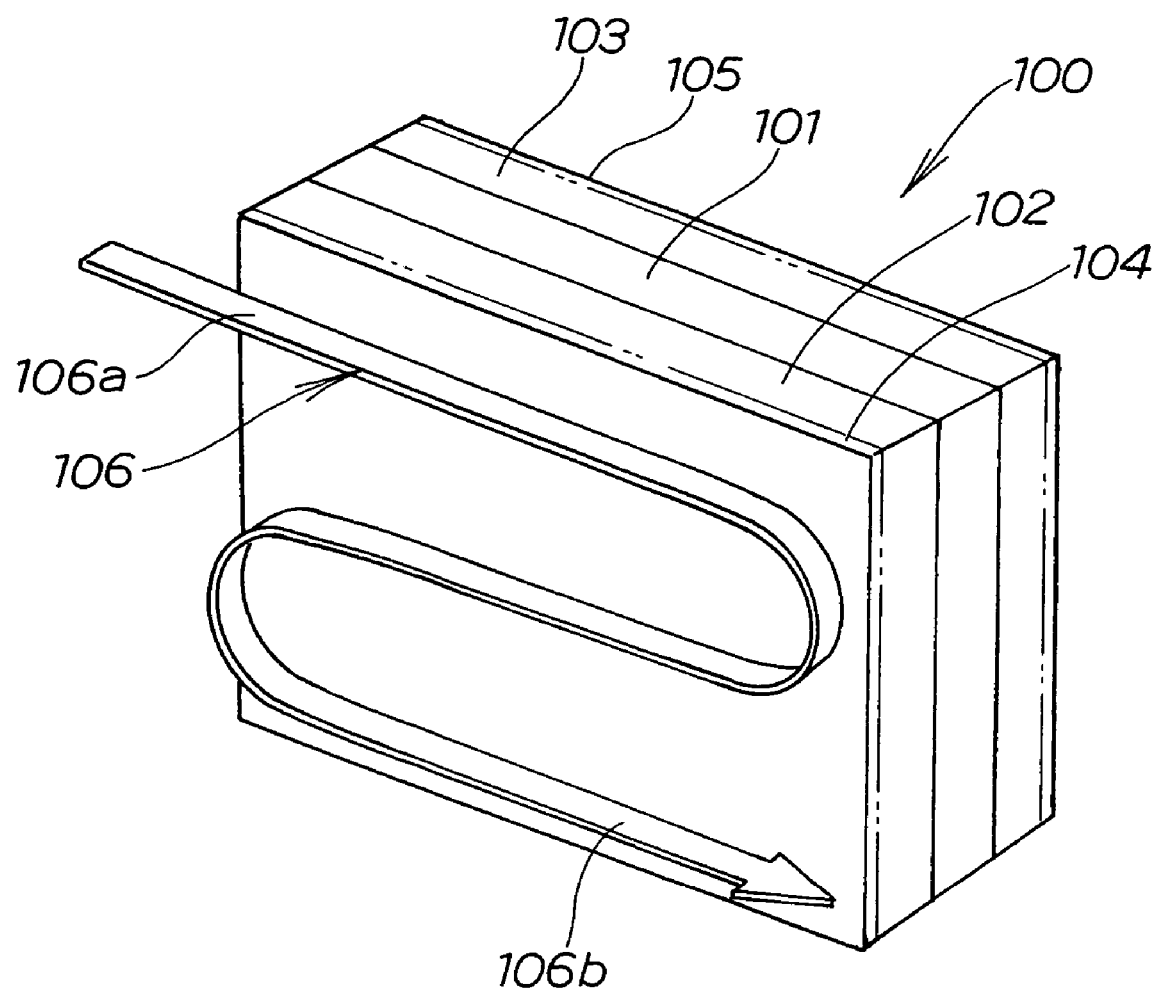
FIG. 15 is a perspective view showing a fuel cell (one cell) of related art.
Figure 16:
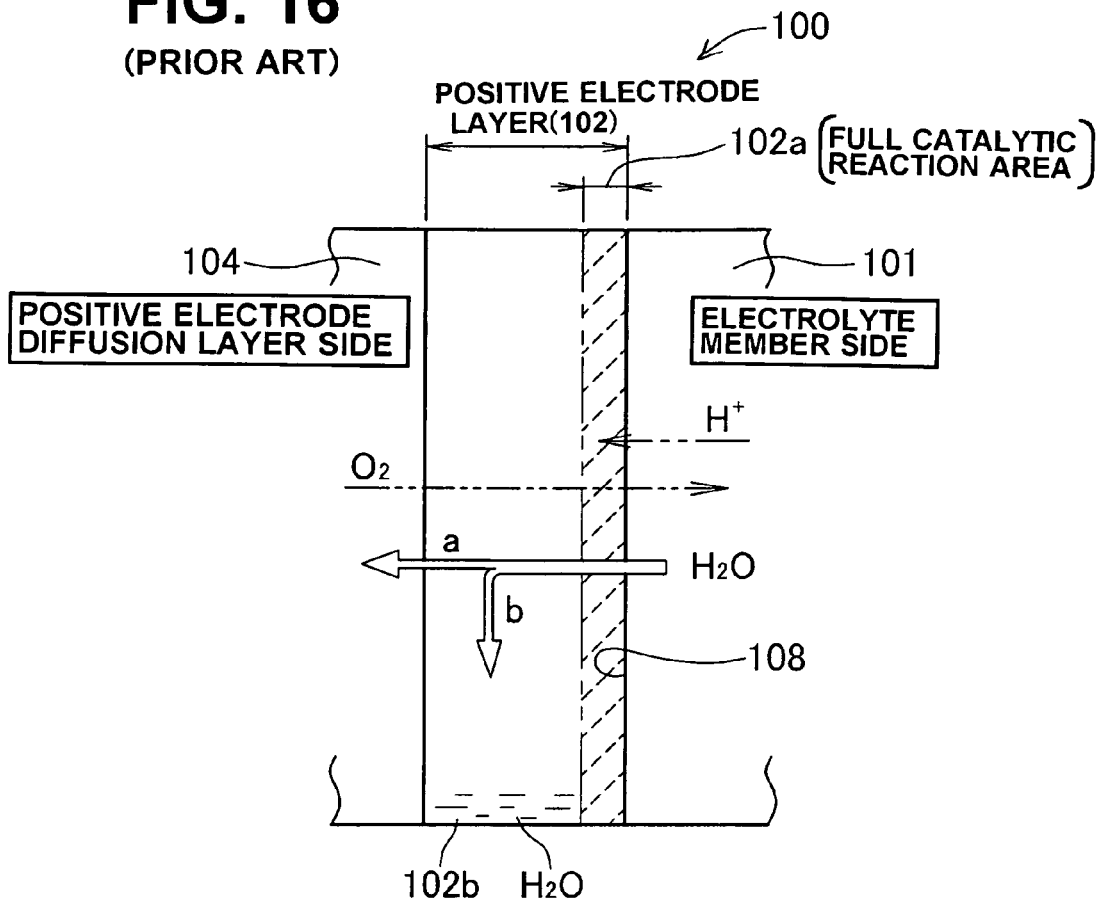
FIG. 16 is a partial sectional view of the fuel cell shown in FIG. 15, and is a view illustrating a reaction between oxygen and hydrogen ions, and product water.
Figure 17:
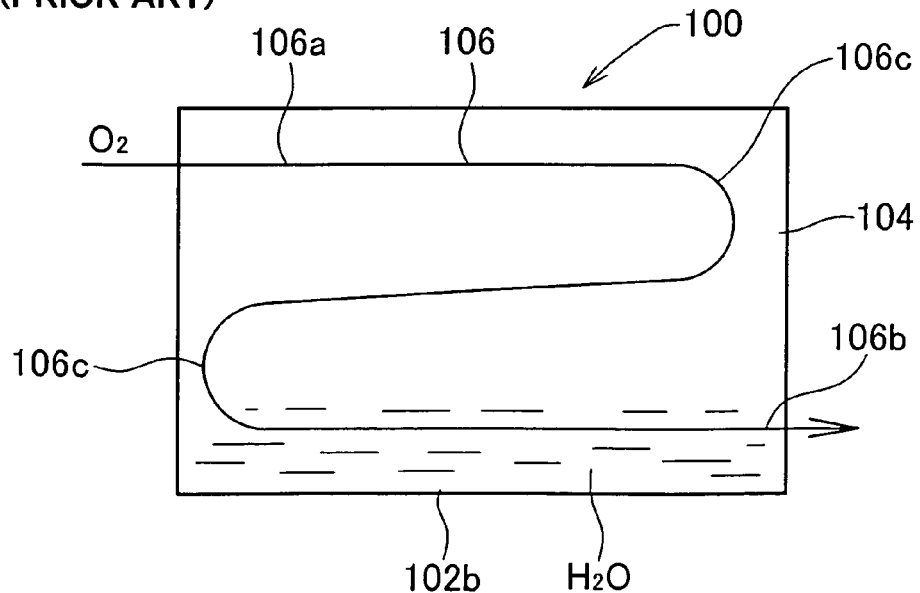
FIG. 17 is a view showing product water stagnating along an oxygen gas passage shown in FIG. 15.

Finally, as shown in FIG. 14D, a coater 90 is moved as shown by the arrow D over a top face 84 formed by disposing multiple large-diameter carbons 36 carrying the catalyst 38 in a dense state on their surface. With this coater 90, a paste for making an electrolyte membrane (ion exchange film) 12 on the top face 84 of the large-diameter carbon 36 carrying the catalyst 38 in a dense state is applied to form an electrolyte membrane 12.

Specifically, a blade 91 of the coater 90 is disposed parallel with the top face 84 of the carbon 36 a predetermined distance above the top face 84. As this blade 91 is moved along the top face 84 as shown by the arrow D, the electrolyte membrane 12 paste is spread to a constant thickness with this blade 91 and forms an electrolyte membrane 12.

In the steps shown in FIG. 14A to FIG. 14D, an example was described wherein the electrolyte/carbon weight ratio and the carried amount of the catalyst 38 in the positive electrode layer 13 are gradually decreased and the pore-forming material amount and the water-repellent resin amount in the positive electrode layer 13 are gradually increased from the electrolyte membrane 12 side of the positive electrode layer 13 in the direction of the positive electrode diffusion layer 15; however, by using masking in this coating process it is possible to coat a positive electrode layer 13 with different components in each of multiple blocks (for example 45 blocks), as shown in FIG. 7A and FIG. 7B.

By using the piezo pumps 62, 66, 69, 73, 77 and 82 in the coating apparatus 50, it is possible to deliver the slurries from the nozzles in particle form without dispersing them. Therefore, when the positive electrode layer 13 is divided into multiple blocks as shown in FIG. 7A to FIG. 7G, by providing coating parts corresponding to these blocks, it is possible to freely decide components block by block of the positive electrode layer 13 without using masking.

Also, because the coating apparatus 50 is provided with a tank for each component and carries out coating with piezo pumps 62, 66, 69, 73, 77 and 82, the components in the multiple blocks constituting the positive electrode layer 13 can be changed continuously instead of stepwise.

By using this coating apparatus 50 to perform the coating steps shown in FIG. 14A to FIG. 14D, it becomes possible to make the electrolyte/carbon weight ratio and the amount of catalyst carried on the carbon (the carried catalyst amount), among the components of a positive electrode layer 13, gradually decrease as shown in FIG. 3 from the electrolyte membrane 12 side in the direction of the positive electrode diffusion layer 15, as shown by the first arrow 25.

Also, it becomes possible to make the electrolyte/carbon weight ratio and the carried catalyst amount gradually decrease from the vertical-direction top 13a of the positive electrode layer 13 toward the bottom 13b, as shown by the second arrow 26.

Also, it becomes possible to make the electrolyte/carbon weight ratio and the carried catalyst amount gradually decrease from the supply side 18a of the oxygen gas passage 18 toward the discharge side 18b as shown by the third arrow 27.

And also, it becomes possible to make the pore-forming material amount, the pore-forming volatile solvent and the water-repellent resin amount gradually increase from the electrolyte membrane 12 side in the direction of the positive electrode diffusion layer 15, as shown by the fourth arrow 30.

Also, it becomes possible to make the pore-forming material amount, the pore-forming volatile solvent and the water-repellent resin amount gradually increase from the vertical-direction top 13a of the positive electrode layer 13 toward the bottom 13b, as shown by the fifth arrow 31.

And also, it becomes possible to make the pore-forming material amount, the pore-forming volatile solvent and the water-repellent resin amount gradually increase from the supply side 18a of the oxygen gas passage 18 toward the discharge side 18b, as shown by the sixth arrow 32.

Furthermore, it becomes possible to make the electrolyte/carbon weight ratio, the carried catalyst amount, the pore-forming material amount, the pore-forming volatile solvent and the water-repellent resin amount uniform at the face 34 in contact with the electrolyte membrane 12 (the region shown with dashed-line hatching).

Although in the foregoing embodiment an example was described wherein piezo pumps 62, 66, 69, 73, 77 and 82 were used in the coating apparatus 50, it is also possible to employ ordinary ink jets as the coating apparatus 50. Because ink jets can narrow down the application area, they can apply slurries to multiple blocks of a positive electrode layer 13 well.

Also, although in the foregoing embodiment an example was described wherein the slurry applicators 53, 54, 55, 57, 58 and 59 of the coating apparatus 50 were individually provided with injection nozzles 63, 67, 71, 74, 78 and 83 and the slurries were blown in droplets individually from respective nozzles, as another example it is also possible for the injection nozzles 63, 67, 71, 74, 78 and 83 to be connected with each other and for the slurries to be mixed in the connected nozzles and then blown in droplets in a mixed state.

INDUSTRIAL APPLICABILITY

Because this fuel cell has raised generation efficiency in the electrolyte membrane vicinity of the positive electrode layer and makes it possible for product water produced by the reaction between oxygen and hydrogen ions to be drained efficiently and is also inexpensive costwise, it is useful as a fuel cell to be used in various industrial fields and in homes.

The invention claimed is:

1. A fuel cell comprising:
   an electrolyte membrane disposed to have a thickness directed horizontally and having front and rear sides;
   positive and negative electrodes respectively disposed from a horizontal direction on the front and rear sides of the electrolyte membrane and having upper parts and lower parts;
   a positive electrode diffusion layer disposed on the positive electrode;
   a negative electrode diffusion layer disposed on the negative electrode;
   an oxygen gas passage provided on an outer face of the positive electrode diffusion layer; and
   a hydrogen gas passage provided on an outer face of the negative electrode diffusion layer,
   the positive electrode including an electrolyte, carbon, a catalyst carried on the carbon, a pore-forming material and a water-repellent resin,
   such that to electrolyte/carbon weight ratio, and an amount of the carried catalyst included in the positive electrode decrease from an electrolyte membrane side in the direction of the positive electrode diffusion layer, decrease from the top part of the positive electrode in the direction of the bottom part, and decrease from a supply side of the oxygen gas passage toward a discharge side, and
   an amount of the pore-forming material and an amount of the water-repellent resin included in the positive electrode increase from the electrolyte membrane side in the direction of the positive electrode diffusion layer, increase from the top part of the positive electrode in the direction of the bottom part, and increase from the supply side of the oxygen gas passage toward the discharge side.

2. A fuel cell according to claim 1, wherein the positive electrode includes a face in contact with the electrolyte membrane, and the electrolyte/carbon weight ratio, the carried catalyst amount, the pore-forming material amount and the water-repellent resin amount at the face in contact with the electrolyte membrane are uniform.

* * * * *